United States Patent
Borroni-Bird et al.

(10) Patent No.: US 7,441,615 B2
(45) Date of Patent: Oct. 28, 2008

(54) MODULAR CHASSIS WITH SIMPLIFIED BODY-ATTACHMENT INTERFACE

(75) Inventors: Christopher E. Borroni-Bird, Oakland Township, MI (US); Adrian B. Chernoff, Royal Oak, MI (US); Mohsen D. Shabana, Ann Arbor, MI (US); Robert Louis Vitale, Macomb Township, MI (US); Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 1039 days.

(21) Appl. No.: 10/310,131

(22) Filed: Dec. 4, 2002

(65) Prior Publication Data

US 2003/0164255 A1    Sep. 4, 2003

Related U.S. Application Data

(60) Provisional application No. 60/337,994, filed on Dec. 7, 2001.

(51) Int. Cl.
*B60K 8/00* (2006.01)

(52) U.S. Cl. .................. 180/58; 180/402; 280/785

(58) Field of Classification Search .................. 280/58, 280/54.1, 65.1, 333, 402, 785; 429/22; 296/203.01, 296/35.3
See application file for complete search history.

(56) References Cited

U.S. PATENT DOCUMENTS

| | | | |
|---|---|---|---|
| 2,303,286 A | 11/1942 | Lake | |
| 2,927,817 A | 3/1960 | Raup | ........................... 296/35 |
| 3,722,948 A | 3/1973 | Walsh et al. | |
| 4,165,794 A | 8/1979 | Warner et al. | |
| 4,189,864 A | 2/1980 | Saito | ........................... 46/202 |
| 4,216,839 A | 8/1980 | Gould et al. | |
| 4,363,999 A | 12/1982 | Preikschat | |
| 4,422,685 A | 12/1983 | Bonfilio et al. | ............. 296/197 |
| 4,489,977 A | 12/1984 | Earing, Jr. | |
| 4,842,326 A | 6/1989 | DiVito | ........................ 296/196 |
| 4,881,756 A * | 11/1989 | Kumasaka et al. | .......... 280/785 |
| 5,058,016 A | 10/1991 | Davidovitch | |
| 5,193,635 A | 3/1993 | Mizuno et al. | ............. 180/65.3 |
| 5,352,011 A | 10/1994 | Kihara et al. | |
| 5,366,281 A | 11/1994 | Littlejohn | ........................ 303/3 |
| 5,409,283 A | 4/1995 | Ban | |

(Continued)

FOREIGN PATENT DOCUMENTS

EP    0274993    11/1987

(Continued)

OTHER PUBLICATIONS

Stuart Birch, "Stick or Non-Stick," Automotive Engineering International On Line, Mar. 2000.

(Continued)

*Primary Examiner*—Christopher Ellis
*Assistant Examiner*—Brian Swenson

(57) ABSTRACT

A chassis having systems responsive to a nonmechanical control signals and a simplified body-attachment interface includes preassembled modules to enhance ease and simplicity of chassis assembly. The chassis is preferably configured to minimize the possibility of a preassembled module being incorrectly positioned within the chassis. Methods for advantageously employing preassembled modules to assemble vehicle chassis are also provided.

2 Claims, 28 Drawing Sheets

U.S. PATENT DOCUMENTS

| | | | |
|---|---|---|---|
| 5,418,437 A | 5/1995 | Couture et al. | |
| 5,534,848 A | 7/1996 | Steele et al. | 340/517 |
| 5,606,503 A | 2/1997 | Shal et al. | 364/423.098 |
| 5,609,353 A | 3/1997 | Watson | 280/707 |
| 5,641,031 A | 6/1997 | Riemer et al. | 180/65.3 |
| 5,725,350 A | 3/1998 | Christenson | 414/491 |
| 5,813,487 A | 9/1998 | Lee et al. | 180/65.1 |
| 5,823,636 A | 10/1998 | Parker et al. | 303/3 |
| 5,855,394 A * | 1/1999 | Horton et al. | 280/781 |
| 5,974,847 A | 11/1999 | Saunders et al. | 72/57 |
| 6,059,058 A | 5/2000 | Dower | 180/65.3 |
| 6,097,286 A | 8/2000 | Discenzo | |
| 6,102,151 A | 8/2000 | Shimizu et al. | |
| 6,176,341 B1 | 1/2001 | Ansari | 180/402 |
| 6,195,999 B1 | 3/2001 | Arnold et al. | 60/649 |
| 6,208,923 B1 | 3/2001 | Hommel | 701/42 |
| 6,219,604 B1 | 4/2001 | Dilger et al. | 701/41 |
| 6,223,843 B1 | 5/2001 | O'Connell et al. | 180/65.3 |
| 6,253,588 B1 | 7/2001 | Rashid et al. | 72/57 |
| 6,276,477 B1 * | 8/2001 | Ida | 180/89.1 |
| 6,305,758 B1 | 10/2001 | Hageman et al. | 303/115.2 |
| 6,318,494 B1 | 11/2001 | Pattok | 180/402 |
| 6,321,145 B1 | 11/2001 | Rajashekara | 701/22 |
| 6,370,460 B1 | 4/2002 | Kaufmann et al. | 701/41 |
| 6,378,637 B1 | 4/2002 | Ono et al. | 180/65.3 |
| 6,390,565 B2 | 5/2002 | Riddiford et al. | 303/3 |
| 6,394,207 B1 | 5/2002 | Skala | 180/65.2 |
| 6,394,218 B1 | 5/2002 | Heitzer | 180/402 |
| 6,394,537 B1 | 5/2002 | DeRees | |
| 6,397,134 B1 | 5/2002 | Shal et al. | 701/37 |
| 6,398,262 B1 * | 6/2002 | Ziech et al. | 280/785 |
| 6,408,966 B1 | 6/2002 | Benz et al. | |
| 6,424,900 B2 | 7/2002 | Murray et al. | |
| 6,435,584 B1 | 8/2002 | Bonnville | |
| 6,488,345 B1 | 12/2002 | Woody et al. | |
| 6,766,873 B2 * | 7/2004 | Chernoff et al. | 180/65.1 |

FOREIGN PATENT DOCUMENTS

| | | |
|---|---|---|
| GB | 2060514 | 5/1981 |
| GB | 2 178 701 A | 2/1987 |
| GB | 2 207 096 A | 1/1989 |

OTHER PUBLICATIONS

Sanket Amberkar, et al., "A System-Safety Process for by-Wire Automotive Systems", SAE Technical Paper, 2000-01-1056, SAE World Congress, Detroit, MI, Mar. 2000.

Edmunds.com Editors, "Why Drive-by-Wire?", The New York Times, Nov. 29, 2000.

* cited by examiner

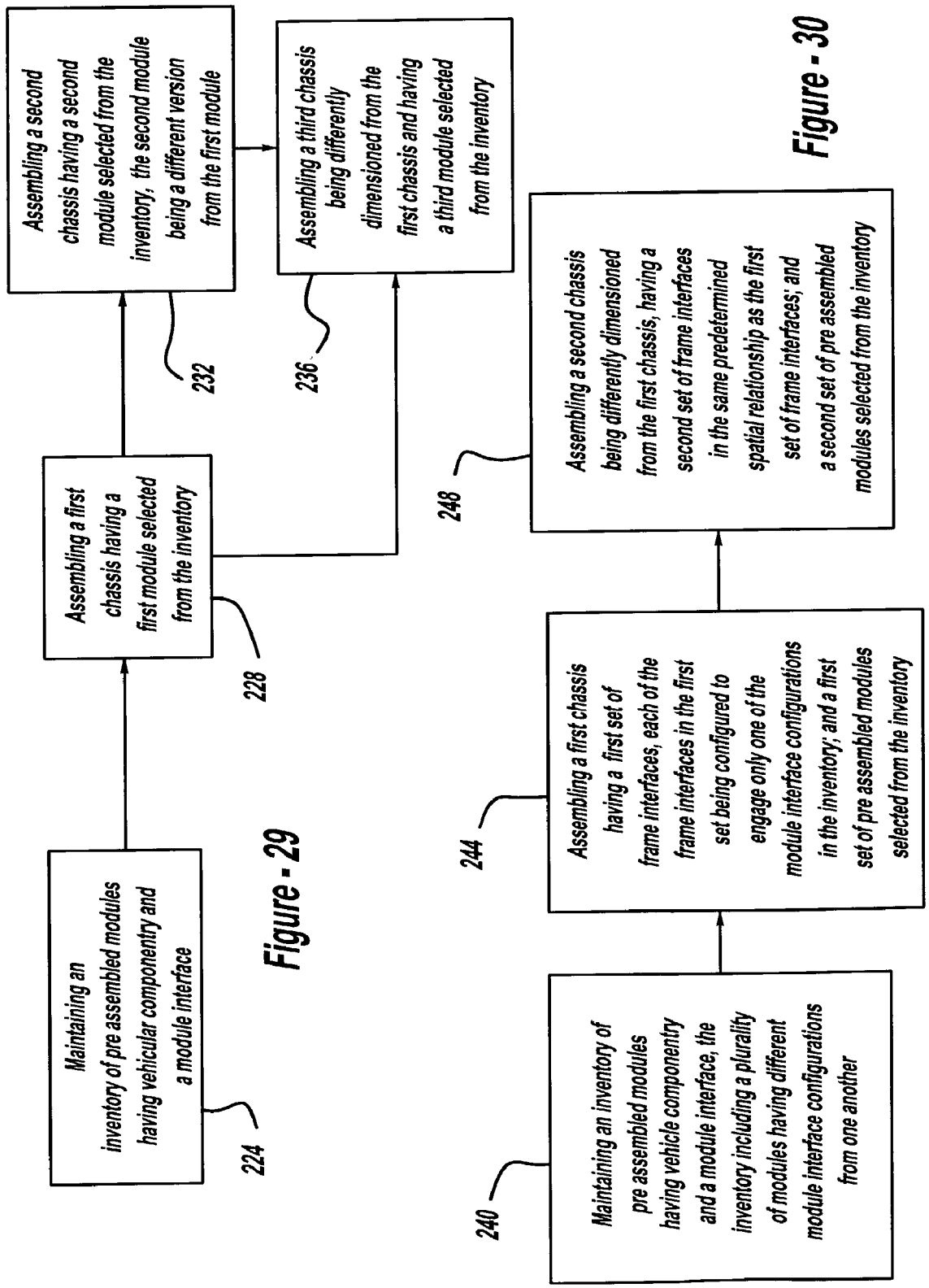

MODULAR CHASSIS WITH SIMPLIFIED BODY-ATTACHMENT INTERFACE

CROSS-REFERENCE TO RELATED APPLICATIONS

This application claims the benefit of U.S. Provisional Application No. 60/337,994, filed Dec. 7, 2001, which is hereby incorporated by reference in its entirety.

TECHNICAL FIELD

This invention relates to vehicle chassis having systems responsive to non-mechanical control signals for a simplified body-attachment interface, and modules to enhance ease and simplicity of chassis assembly.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical, and structural components that, in combination with a body, comprise a fully functional vehicle. The nature of the prior art connections between a vehicle body and vehicular componentry may result in certain inefficiencies in the design, manufacture, and use of vehicles. Three characteristics of prior art body connections that significantly contribute to these inefficiencies are the quantity of connections; the mechanical nature of many of the connections; and the locations of the connections on the body and on the componentry.

In the prior art, the connections between a body and componentry are numerous. Each connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electrical energy to the body from electricity-generating components and to transmit data from sensors that monitor the status of the componentry; mechanical control linkages, such as the steering column, throttle cable, and transmission selector; and ductwork and hoses to convey fluids such as heated and cooled air from an HVAC unit to the body for the comfort of passengers.

Many of the connections in the prior art, particularly those connections that transmit control signals, are mechanical linkages. For example, to control the direction of the vehicle, a driver sends control signals to the steering system via a steering column. Mechanical linkages result in inefficiencies, in part, because different driver locations in different vehicles require different mechanical linkage dimensions and packaging. Thus, new or different bodies often cannot use "off-the-shelf" components and linkages. Componentry for one vehicle body configuration is typically not compatible for use with other vehicle body configurations. Furthermore, if a manufacturer changes the design of a body, a change in the design of the mechanical linkage and the component to which it is attached may be required. The change in design of the linkages and components requires modifications to the tooling that produces the linkages and components.

The location of the connections on prior art vehicle bodies and componentry also results in inefficiencies. In prior art body-on-frame architecture, connection locations on the body are often not exposed to an exterior face of the body, and are distant from corresponding connections on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

Furthermore, prior art vehicles typically have internal combustion engines that have a height that is a significant proportion of the overall vehicle height. Prior art vehicle bodies are therefore designed with an engine compartment that occupies about a third of the front (or sometimes the rear) of the body length. Compatibility between an engine and a vehicle body requires that the engine fit within the body's engine compartment without physical part interference. Moreover, compatibility between a prior art chassis with an internal combustion engine and a vehicle body requires that the body have an engine compartment located such that physical part interference is avoided. For example, a vehicle body with an engine compartment in the rear is not compatible with a chassis with an engine in the front.

SUMMARY OF THE INVENTION

A self-contained chassis has substantially all of the mechanical, electrical, and structural componentry necessary for a fully functional vehicle, including at least an energy conversion system, a suspension and wheels, a steering system, and a braking system. The chassis has a simplified, and preferably standardized, interface with connection components to which bodies of substantially varying design can be attached. X-by-wire technology is utilized to eliminate mechanical control linkages.

The chassis includes preassembled modules that at least partially form at least one of the systems on the chassis. The preassembled modules enhance manufacturing flexibility and ease of chassis assembly. To minimize the possibility of assembly error, the chassis preferably includes locating members and unique interfaces at which the preassembled modules are mounted with respect to a structural frame. Methods for advantageously employing preassembled modules in chassis assembly are also provided.

The invention reduces the amount of time and resources required to design and manufacture new vehicle bodies. Body designs need only conform to the simple attachment interface of the chassis, eliminating the need to redesign or reconfigure expensive components.

The invention also allows a multitude of body configurations to share a common chassis, enabling economies of scale for major mechanical, electrical, and structural components.

Connection components, exposed and unobstructed, increase manufacturing efficiency because attachment of a body to the chassis requires only engagement of the connection components to respective complementary connection components on a vehicle body.

Vehicle owners can increase the functionality of their vehicles at a lower cost than possible with the prior art because a vehicle owner need buy only one chassis upon which to mount a multitude of body styles.

The above objects, features, aspects, and advantages, and other objects features, aspects, and advantages, of the present invention are readily apparent from the following detailed description of the best mode for carrying out the invention when taken in connection with the accompanying drawings.

DESCRIPTION OF THE DRAWINGS

FIG. 29 is a schematic illustration of a method for advantageously using preassembled modules to assemble rolling platforms; and FIG. 30 is a schematic illustration of yet another method for advantageously using preassembled modules to assemble rolling platforms.

DETAILED DESCRIPTION OF THE PREFERRED EMBODIMENT

Figure 1:
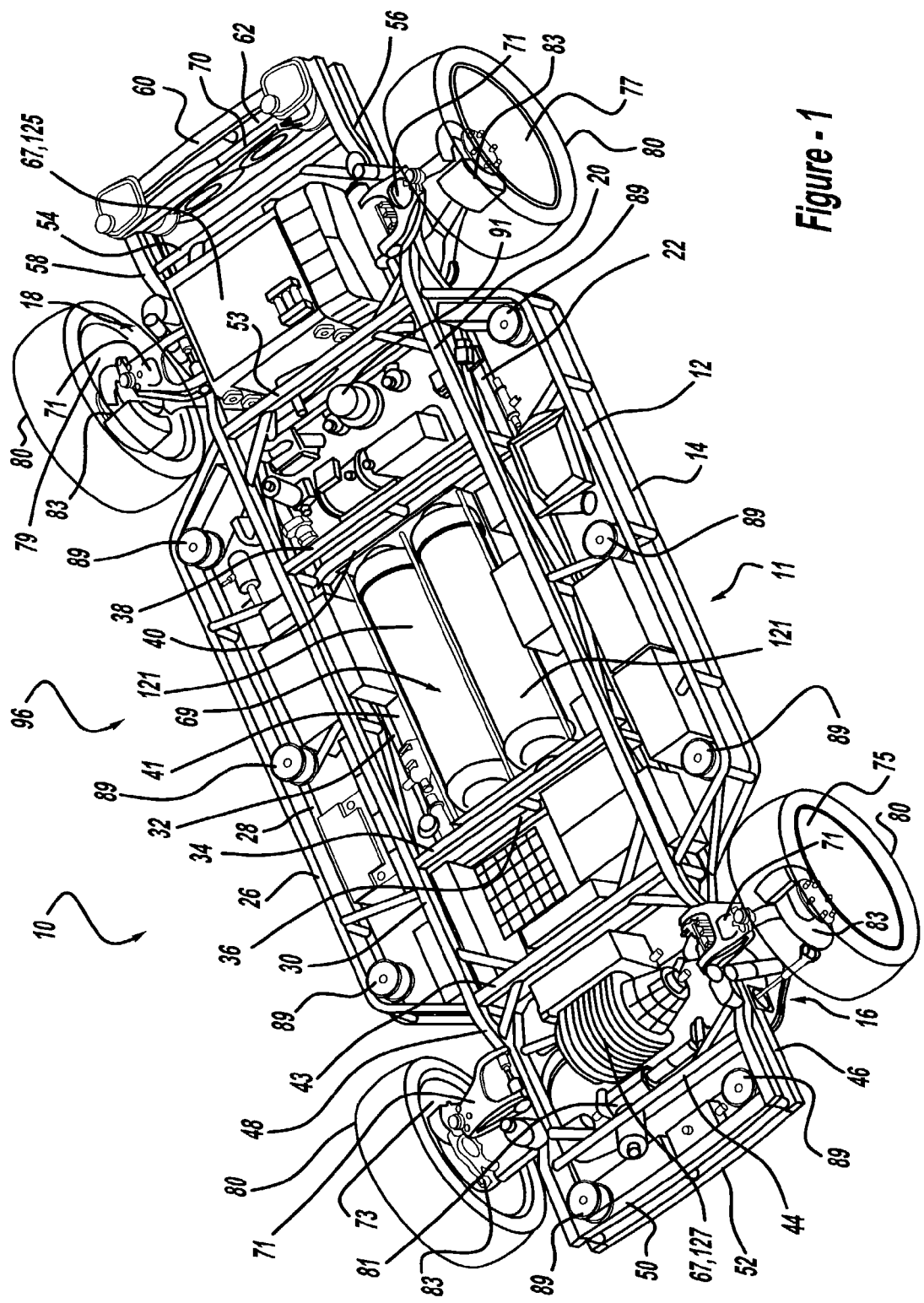
FIG. 1 is a schematic illustration in perspective view of a vehicle rolling platform according to an embodiment of the present invention.

Referring to FIG. 1, a vehicle chassis 10 in accordance with the invention, also referred to as the "rolling platform," includes a structural frame 11. The structural frame 11 depicted in FIG. 1 comprises a series of interconnected structural elements including upper and lower side structural elements 12 and 14 that comprise a "sandwich"-like construction. Elements 12 and 14 are substantially rigid tubular (or optionally solid), members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements 26, 28, 30 and 32 extend along the right side thereof.

Lateral structural elements 34, 36 extend between elements 20, 30 and 22, 32, respectively nearer the front axle area 16 and lateral structural elements 38, 40 extend between elements 20, 30 and 22, 32, respectively nearer the rear axle area 18, thereby defining a mid-chassis space 41. The front axle area 16 is defined in and around structural elements 43, 44 at the rear and front, and on the sides by structural elements 46, 48 which may be extensions of the elements 20, 22, 30, 32 or connected therewith. Forward of the front axle area, a forward space is defined between element 44 and elements 50, 52. The rear axle area 18 is defined in and around structural elements 53, 54 at the front and rear, and on the sides by structural elements 56, 58, which may be extensions of the elements 20, 22, 30, 32 or connected therewith. Rearward of the rear axle area 18, a rearward space is defined between element 54 and elements 60, 62. Alternatively, the rear axle area 18 or the rearward space may be elevated relative to the rest of the structural frame 11 if necessary to accommodate an energy conversion system, and the frame may include other elements to surround and protect an energy conversion system. The frame defines a plurality of open spaces between the elements described above. Those skilled in the art will recognize materials and fastening methods suitable for use in the structural frame. For example, the structural elements may be tubular, aluminum, and welded at their respective connections to other structural elements.

Figure 2:
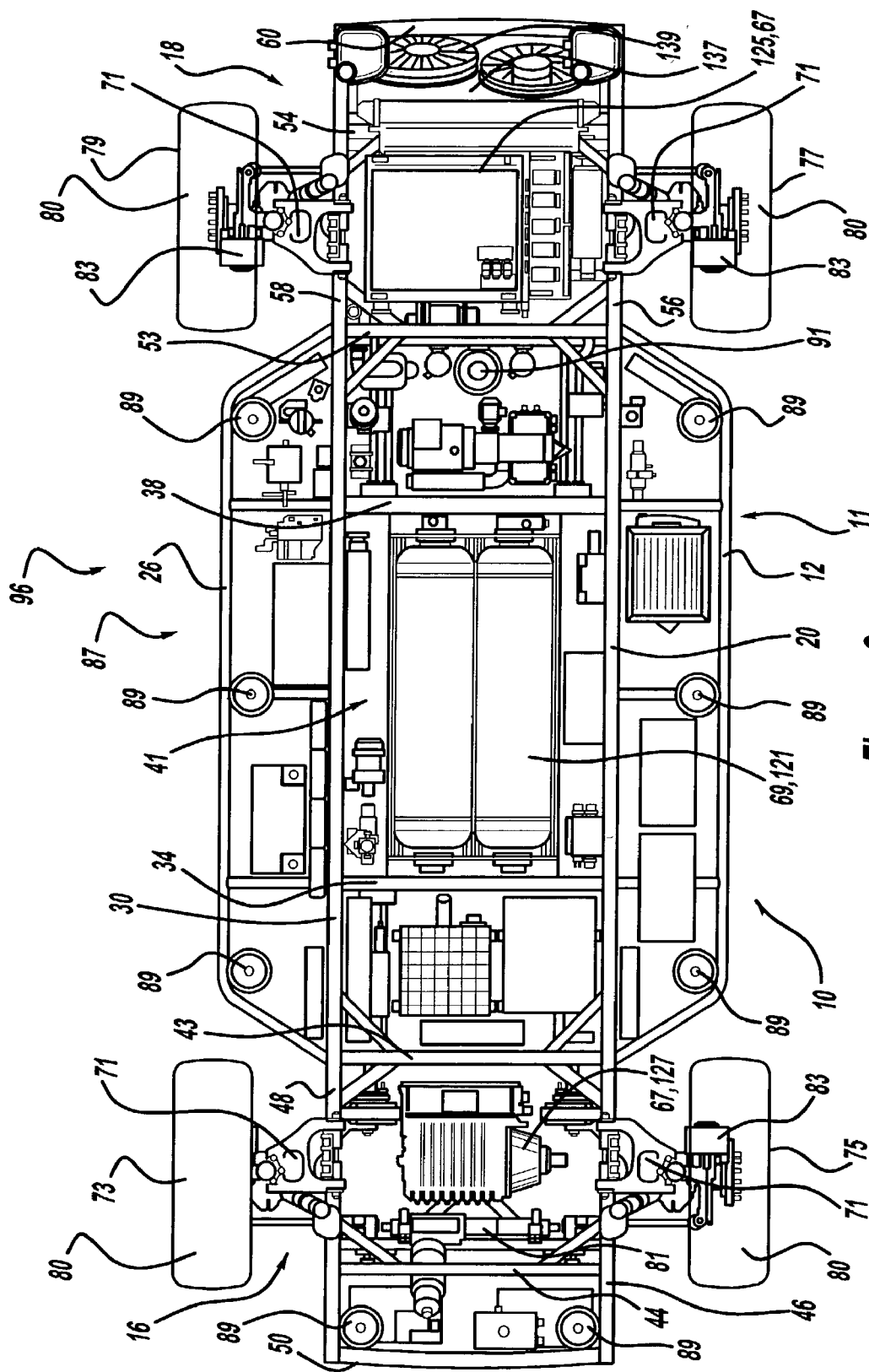
FIG. 2 is a top view schematic illustration of the vehicle rolling platform shown in FIG. 1.
Figure 3:
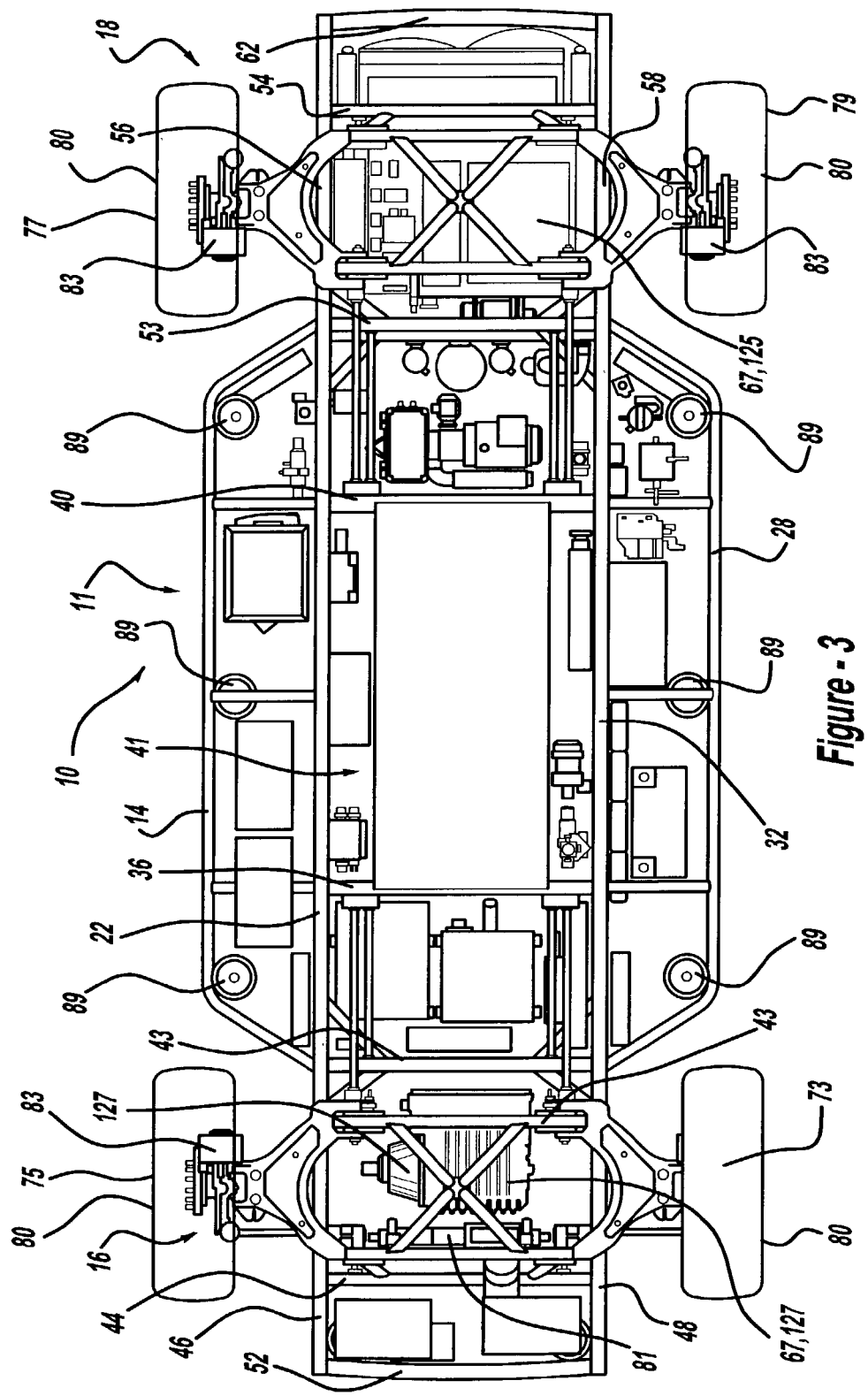
FIG. 3 is a bottom view schematic illustration of the vehicle rolling platform shown in FIGS. 1 and 2.
Figure 4:
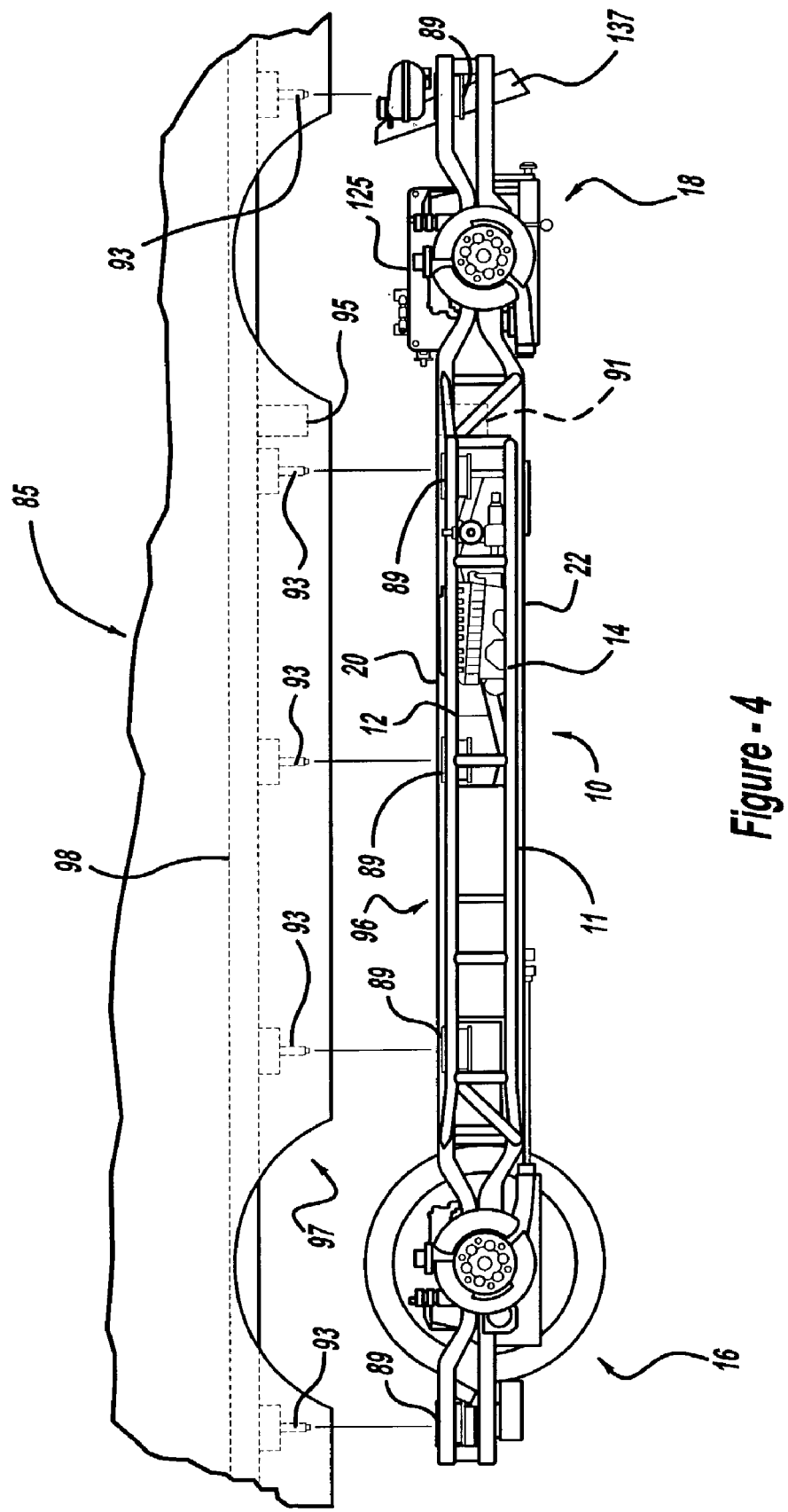
FIG. 4 is a schematic illustration in side view of a vehicle body pod and rolling platform attachment scenario according to the present invention that is useful with the embodiments of FIGS. 1-3.

The structural frame 11 provides a rigid structure to which an energy conversion system 67, energy storage system 69, suspension system 71 with wheels 73, 75, 77, 79 (each wheel having a tire 80), steering system 81, and braking system 83 are mounted, as shown in FIGS. 1-3, and is configured to support an attached body 85, as shown in FIG. 4. A person of ordinary skill in the art will recognize that the structural frame 11 can take many different forms, in addition to the cage-like structure of the embodiment depicted in FIGS. 1-3. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components. The structural frame may also be integrated with various chassis components.

Referring to FIG. 2, a body attachment interface 87 is defined as the sum of all body connection components, i.e., connective elements that function to operably mate a vehicle body to the chassis 10. The body connection components of the preferred embodiment include a plurality of load-bearing body-retention couplings 89 mounted with respect to the structural frame 11 and a single electrical connector 91.

As shown in FIG. 4, the load-bearing body-retention couplings 89 are engageable with complementary attachment couplings 93 on a vehicle body 85 and function to physically fasten the vehicle body 85 to the chassis 10. Those skilled in the art will recognize that a multitude of fastening and locking elements may be used and fall within the scope of the claimed invention. The load-bearing body-retention couplings 89 are preferably releasably engageable with complementary couplings, though non-releasably engageable couplings such as weld flanges or riveting surfaces may be employed within the scope of the claimed invention. Ancillary fastening elements may be used as lock downs in conjunction with the load-bearing body-retention couplings. Load-bearing surfaces without locking or fastening features on the chassis 10 may be used with the load-bearing body-retention couplings 89 to support the weight of an attached vehicle body 85. In the preferred embodiment, the load-bearing body-retention couplings 89 include support brackets with bolt holes. Rubber mounts (not shown) located on the support brackets dampen vibrations transmitted between the body and the chassis. Alternatively, hard mounts may be employed for body-retention couplings.

The electrical connector 91 is engageable with a complementary electrical connector 95 on a vehicle body 85. The electrical connector 91 of the preferred embodiment may perform multiple functions, or select combinations thereof. First, the electrical connector 91 may function as an electrical power connector, i.e., it may be configured to transfer electrical energy generated by components on the chassis 10 to a vehicle body 85 or other non-chassis destination. Second, the electrical connector 91 may function as a control signal receiver, i.e., a device configured to transfer non-mechanical control signals from a non-chassis source to controlled systems including the energy conversion system, steering system, and braking system. Third, the electrical connector 91 may function as a feedback signal conduit through which feedback signals are made available to a vehicle driver. Fourth, the electrical connector 91 may function as an external programming interface through which software containing algorithms and data may be transmitted for use by controlled systems. Fifth, the electrical connector may function as an information conduit through which sensor information and other information is made available to a vehicle driver. The electrical connector 91 may thus function as a communications and power "umbilical" port through which all communications between the chassis 10 and an attached vehicle body 85 are transmitted. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

If one electrical connector performing multiple functions is not desirable, for example, if a cumbersome wire bundle is required, or power transmission results in control signal interference, the body attachment interface 87 may include a plurality of electrical connectors 91 engageable with a plurality of complementary electrical connectors 95 on a vehicle body 85, with different connectors performing different functions. A complementary electrical connector 95 performs functions complementary to the function of the electrical connector with which it engages, for example, functioning as a control signal transmitter when engaged with a control signal receiver.

Referring again to FIGS. 1-3, the energy conversion system 67, energy storage system 69, steering system 81, and braking system 83, are configured and positioned on the chassis 10 to minimize the overall vertical height of the chassis 10 and to maintain a substantially horizontal upper chassis face 96. A face of an object is an imaginary surface that follows the contours of the object that face, and are directly exposed to, a particular direction. Thus, the upper chassis face 96 is an imaginary surface that follows the upwardly facing and exposed contours of the chassis frame 11 and systems mounted therein. Matable vehicle bodies have a corresponding lower body face 97 that is an imaginary surface that follows the downwardly facing and exposed contours of the body 85, as shown in FIG. 4.

Referring again to FIGS. 1-3, the structural frame 11 has a thickness defined as the vertical distance between its highest point (the top of structural element 20) and its lowest point (the bottom of structural element 22). In the preferred embodiment, the structural frame thickness is approximately 11 inches. To achieve a substantially horizontal upper chassis face 96, the energy conversion system 67, energy storage system 69, steering system 81, and braking system 83 are distributed throughout the open spaces and are configured, positioned, and mounted to the structural frame 11 such that the highest point of any of the energy conversion system 67, energy storage system 69, steering system 81, and braking system 83 does not extend or protrude higher than the highest point of the structural frame 11 by an amount more than 50% of the structural frame thickness. Alternatively, the highest point of any of the energy conversion system 67, energy storage system 69, steering system 81, and braking system 83 does not extend or protrude higher than the top of any of the tires 80. Alternatively, the highest point of any of the energy conversion system 67, energy storage system 69, steering system 81, and braking system 83 does not extend or protrude higher than the top of any of the wheels 73, 75, 77, 79. In the context of the present invention, a tire is not considered part of a wheel. A wheel typically comprises a rim and a wheel disc or nave that connects the rim to a wheel hub, and does not include a mounted tire. A tire is mounted around the periphery of a wheel. The substantially horizontal upper chassis face 96 enables the attached vehicle body 85 to have a passenger area that extends the length of the chassis, unlike prior art bodies that have an engine compartment to accommodate a vertically-protruding internal combustion engine.

Most of the powertrain load is evenly distributed between the front and rear of the chassis so there is a lower center of gravity for the whole vehicle without sacrificing ground clearance, thereby enabling improved handling while resisting rollover forces.

Referring again to FIG. 4, the preferred embodiment of the rolling platform 10 is configured such that the lower body face 97 of a matable vehicle body 85 is positioned closely adjacent to the upper chassis face 96 for engagement with the rolling platform 10. The body connection components have a predetermined spatial relationship relative to one another, and are sufficiently positioned, exposed, and unobstructed such that when a vehicle body 85 having complementary connection components (complementary attachment couplings 93 and a complementary electrical connector 95) in the same predetermined spatial relationship as the body connection components is sufficiently positioned relative to the upper chassis face 96 of a chassis 10 of the invention, the complementary connection components are adjacent to corresponding body connection components and ready for engagement, as depicted in FIG. 4. In the context of the present invention, a body connection component having a protective covering is exposed and unobstructed if the protective covering is removable or retractable.

Figure 5:
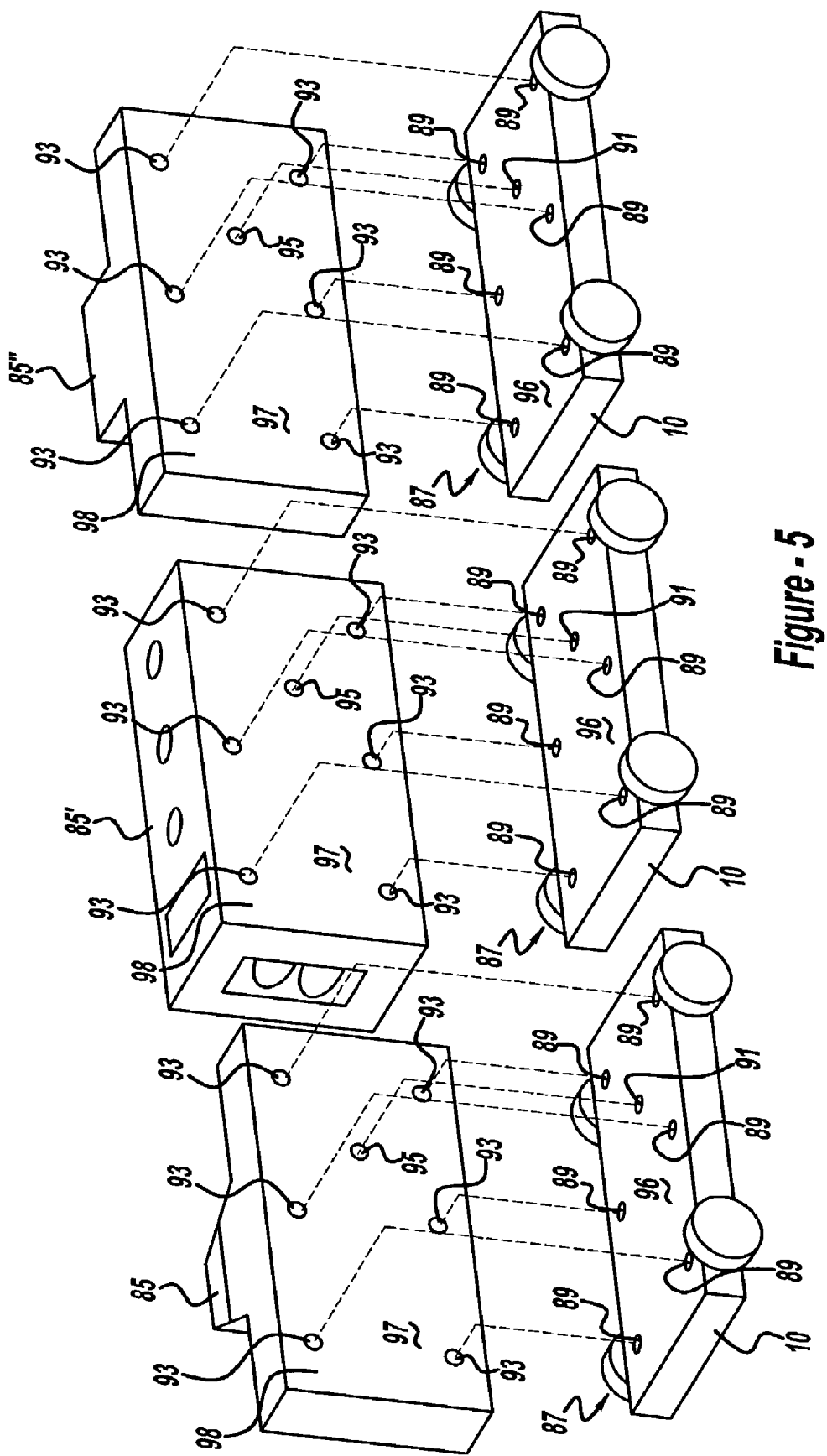
FIG. 5 is a schematic illustration of a vehicle body pod and rolling platform attachment scenario, wherein body pods of differing configurations are each attachable to identical rolling platforms.

Each body connection component has a spatial relationship relative to each of the other body connection components that can be expressed, for example, as a vector quantity. Body connection components and complementary connection components have the same predetermined spatial relationship if the vector quantities that describe the spatial relationship between a body connection component and the other body connection components to be engaged also describe the spatial relationship between a corresponding complementary connection component and the other complementary connection components to be engaged. For example, the spatial relationship may be defined as follows: a first body connection component is spaced a distance Ax+By from a reference point; a second body connection component is spaced a distance Cx+Dy from the reference point; a third body connection component is spaced a distance Ex+Fy from the reference point, etc. Corresponding complementary connection components in the same predetermined spatial relationship are spaced in a mirror image relationship in the lower body face, as depicted in FIGS. 4 and 5. A protective covering (not shown) may be employed to protect any of the body connection components.

The body connection components and the complementary connection components are preferably adjacent without positional modification when a vehicle body 85 is sufficiently positioned relative to a chassis 10 of the invention; however, in the context of the present invention, the body connection components may be movable relative to each other within a predetermined spatial relationship to accommodate build tolerances or other assembly issues. For example, an electrical connector may be positioned and operably connected to a signal-carrying cable. The cable may be fixed relative to the structural frame at a point six inches from the electrical connector. The electrical connector will thus be movable within six inches of the fixed point on the cable. A body connection component is considered adjacent to a complementary connection component if one or both are movable within a predetermined spatial relationship so as to be in contact with each other.

Referring to FIG. 5, the body-attachment interface of the claimed invention enables compatibility between the chassis 10 and different types of bodies 85, 85', 85" having substantially different designs. Bodies 85, 85', 85" having a common base 98 with complementary attachment couplings 93 and complementary electrical connectors 95 in the same predetermined spatial relationship with one another as the predetermined spatial relationship between body connection components on the body-attachment interface 87, are each matable with the chassis 10 by positioning the body 85, 85', 85" relative to the chassis 10 such that each complementary attachment coupling 93 is adjacent to a load-bearing body-retention coupling 89, and the complementary electrical connector 95 is adjacent to the electrical connector 91. Preferably, all bodies and chassis comply with this common, standardized interface system, thereby facilitating compatibility between a wide array of different body types and styles and a single chassis design. The substantially horizontal upper chassis face 96 also facilitates compatibility between the rolling platform 10 and a multitude of differently-configured body styles. The common base 98 functions as a body structural unit and forms the lower body face 97 in the embodiment depicted. FIG. 5 schematically depicts a sedan 85, a van 85', and a pickup truck 85" each having a common base 98.

The body connection components are preferably sufficiently exposed at a chassis face to facilitate attachment to complementary connection components on a matable vehicle body. Similarly, complementary connection components on a matable vehicle body are sufficiently exposed at a body face to facilitate attachment to body connection components on a vehicle chassis. The body connection components are preferably located at or above the upper chassis face for engagement with complementary connection components located at or below a lower body face.

A connection device may be employed to engage or operably connect a body connection component with a distant complementary connection component, in the situation where a vehicle body does not have complementary connection components in the same predetermined spatial relationship as the body connection components on a vehicle chassis. For example, a cable having two connectors, one connector engageable with the electrical connector on a body attachment interface and the other connector engageable with a complementary connector on a matable vehicle body, may be used to operably connect the electrical connector and the complementary connector.

The bodies 85, 85', 85" shown schematically in FIG. 5 each use all of the body connection components on the vehicle chassis 10. However, within the scope of the claimed invention, a chassis may have more body connection components than are actually mated with a vehicle body. For example, a chassis may have ten load-bearing body-retention couplings, and be matable with a body that engages only five of the ten load-bearing body-retention couplings. Such an arrangement is particularly useful when an attachable body is of a different size than the chassis. For example, a matable body may be smaller than a chassis. Similarly, and within the scope of the claimed invention, a body may be modular such that separate body components are independently connected to the vehicle chassis by the load-bearing body-retention couplings.

A body may have more complementary connection components than are engageable with the body connection components of a particular chassis. Such an arrangement may be employed to enable a particular body to be matable to multiple chassis each having a different predetermined spatial relationship among its body connection components.

The load-bearing body-retention couplings 89 and the electrical connector 91 are preferably releasably engageable without damage to either an attached body 85 or the chassis 10, thereby enabling removal of one body 85 from the chassis 10 and installation of a different body 85', 85" on the chassis 10.

In the preferred embodiment, the body-attachment interface 87 is characterized by the absence of any mechanical control signal-transmission linkages and any couplings for attaching mechanical control signal-transmission linkages. Mechanical control linkages, such as steering columns, limit the compatibility between a chassis and bodies of different configurations.

Referring to FIG. 1, the steering system 81 is housed in the front axle area 16 and is operably connected to the front wheels 73, 75. Preferably, the steering system 81 is responsive to non-mechanical control signals. In the preferred embodiment, the steering system 81 is by-wire. A by-wire system is characterized by control signal transmission in electrical form. In the context of the present invention, "by-wire" systems, or systems that are controllable "by-wire," include systems configured to receive control signals in electronic form via a control signal receiver on the body attachment interface 87, and respond in conformity to the electronic control signals.

Figure 6:
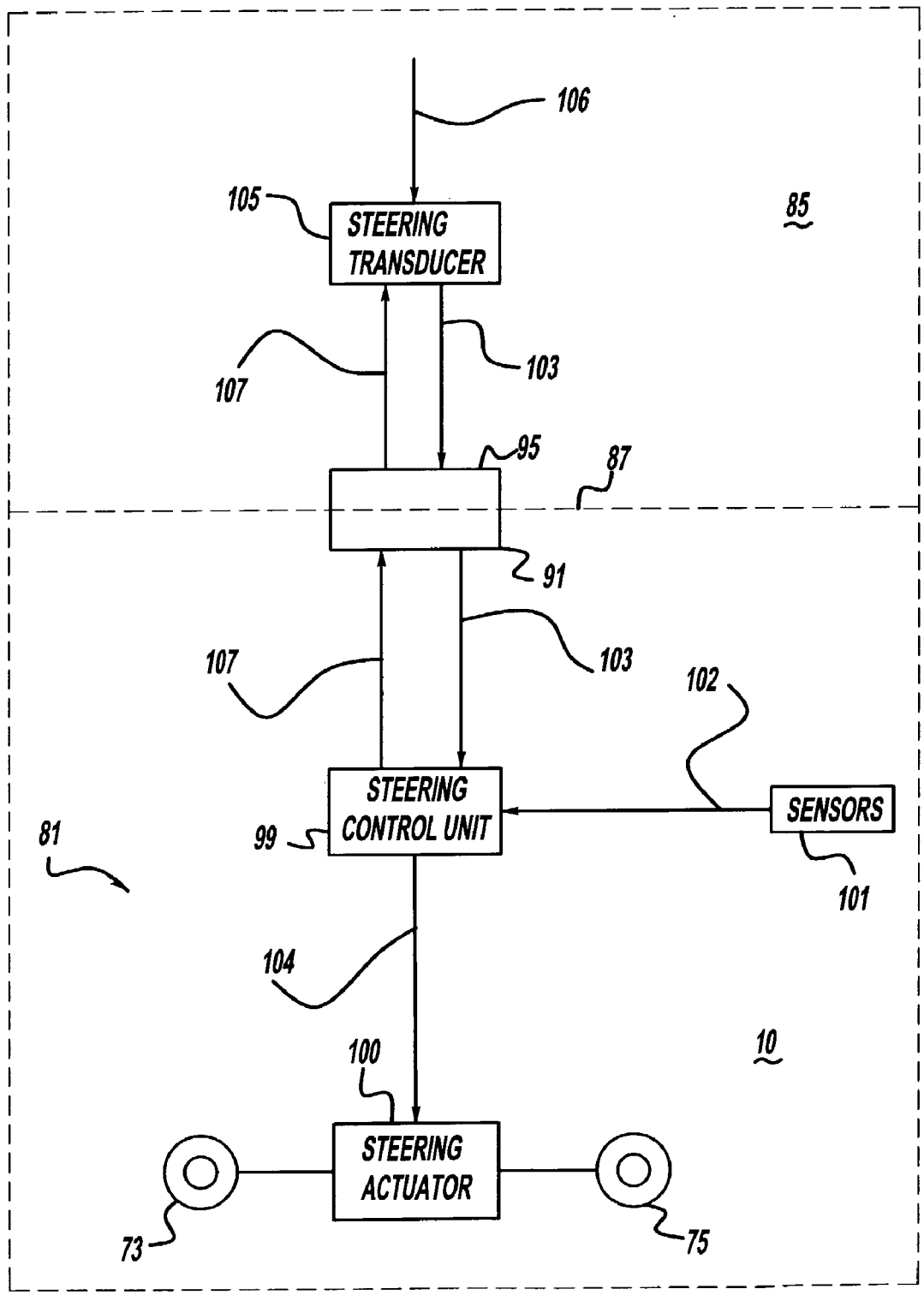
FIG. 6 is a schematic illustration of a steering system for use with the rolling platform and body pod shown in FIG. 4.

Referring to FIG. 6, the by-wire steering system 81 of the preferred embodiment includes a steering control unit 99, and a steering actuator 100. Sensors 101 are located on the chassis 10 and transmit sensor signals 102 carrying information concerning the state or condition of the chassis 10 and its component systems. The sensors 101 may include position sensors, velocity sensors, acceleration sensors, pressure sensors, force and torque sensors, flow meters, temperature sensors, etc. The steering control unit 99 receives and processes sensor signals 102 from the sensors 101 and electrical steering control signals 103 from the electrical connector 91, and generates steering actuator control signals 104 according to a stored algorithm. A control unit typically includes a microprocessor, ROM and RAM and appropriate input and output circuits of a known type for receiving the various input signals and for outputting the various control commands to the actuators. Sensor signals 102 may include yaw rate, lateral acceleration, angular wheel velocity, tie-rod force, steering angle, chassis velocity, etc.

The steering actuator 100 is operably connected to the front wheels 73, 75 and configured to adjust the steering angle of the front wheels 73, 75 in response to the steering actuator control signals 104. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 100 is an electric drive motor configured to adjust a mechanical steering rack.

Referring again to FIG. 6, the preferred embodiment of the chassis 10 is configured such that it is steerable by any source of compatible electrical steering control signals 103 connected to the electrical connector 91. FIG. 6 depicts a steering transducer 105 located on an attached vehicle body 85 and connected to a complementary electrical connector 95. Transducers convert the mechanical control signals of a vehicle driver to non-mechanical control signals. When used with a by-wire system, transducers convert the mechanical control signals to electrical control signals usable by the by-wire system. A vehicle driver inputs control signals in mechanical form by turning a wheel, depressing a pedal, pressing a button, or the like. Transducers utilize sensors, typically position and force sensors, to convert the mechanical input to an electrical signal. In the preferred embodiment, a +/−20 degree slide mechanism is used for driver input, and an optical encoder is used to read input rotation.

The complementary electrical connector 95 is coupled with the electrical connector 91 of the body attachment interface 87. The steering transducer 105 converts vehicle driver-initiated mechanical steering control signals 106 to electrical steering control signals 103 which are transmitted via the electrical connector 91 to the steering control unit 99. In the preferred embodiment, the steering control unit 99 generates steering feedback signals 107 for use by a vehicle driver and transmits the steering feedback signals 107 through the electrical connector 91. Some of the sensors 101 monitor linear distance movement of the steering rack and vehicle speed. This information is processed by the steering control unit 99 according to a stored algorithm to generate the steering feedback signals 107. A torque control motor operably connected to the slide mechanism receives the steering feedback signals 107 and is driven in the opposite direction of the driver's mechanical input.

In the context of the present invention, a "by-wire" system may be an actuator connected directly to an electrical connector in the body attachment interface. An alternative by-wire steering system 81' within the scope of the claimed invention is depicted schematically in FIG. 7, wherein like reference numbers refer to like components from FIG. 6. A steering actuator 100 configured to adjust the steering angle of the front wheels 73, 75 is connected directly to the electrical connector 91. In this embodiment, a steering control unit 99' and a steering transducer 105 may be located in an attached vehicle body 85. The steering transducer 105 would transmit electrical steering control signals 103 to the steering control unit 99', and the steering control unit 99' would transmit steering actuator control signals 104 to the steering actuator 100 via the electrical connector 91. Sensors 101 positioned on the chassis 10 transmit sensor signals 102 to the steering control unit 99' via the electrical connector 91 and the complementary electrical connector 95.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Referring again to FIG. 1, a braking system 83 is mounted to the structural frame 11 and is operably connected to the wheels 73, 75, 77, 79. The braking system is configured to be responsive to non-mechanical control signals. In the preferred embodiment, the braking system 83 is by-wire, as depicted schematically in FIG. 8, wherein like reference numbers refer to like components from FIGS. 6 and 7. Sensors 101 transmit sensor signals 102 carrying information concerning the state or condition of the chassis 10 and its component systems to a braking control unit 108. The braking control unit 108 is connected to the electrical connector 91 and is configured to receive electrical braking control signals 109 via the electrical connector 91. The braking control unit 108 processes the sensor signals 102 and the electrical braking control signals 109 and generates braking actuator control signals 110 according to a stored algorithm. The braking control unit 108 then transmits the braking actuator control signals 110 to braking actuators 111, 112, 113, 114 which act to reduce the angular velocity of the wheels 73, 75, 77, 79. Those skilled in the art will recognize the manner in which the braking actuators 111, 112, 113, 114 act on the wheels 73, 75, 77, 79. Typically, actuators cause contact between friction elements, such as pads and disc rotors. Optionally, an electric motor may function as a braking actuator in a regenerative braking system.

The braking control unit 108 may also generate braking feedback signals 115 for use by a vehicle driver and transmit the braking feedback signals 115 through the electrical connector 91. In the preferred embodiment, the braking actuators 111, 112, 113, 114 apply force through a caliper to a rotor at each wheel. Some of the sensors 101 measure the applied force on each caliper. The braking control unit 108 uses this information to ensure synchronous force application to each rotor.

Referring again to FIG. 8, the preferred embodiment of the chassis 10 is configured such that the braking system is responsive to any source of compatible electrical braking control signals 109. A braking transducer 116 may be located on an attached vehicle body 85 and connected to a complementary electrical connector 95 coupled with the electrical connector 91. The braking transducer 116 converts vehicle driver-initiated mechanical braking control signals 117 into electrical form and transmits the electrical braking control signals 109 to the braking control unit via the electrical connector 91. In the preferred embodiment, the braking transducer 116 includes two hand-grip type assemblies. The braking transducer 116 includes sensors that measure both the rate of applied pressure and the amount of applied pressure to the hand-grip assemblies, thereby converting mechanical braking control signals 117 to electrical braking control signals 109. The braking control unit 108 processes both the rate and amount of applied pressure to provide both normal and panic stopping.

Figure 7:
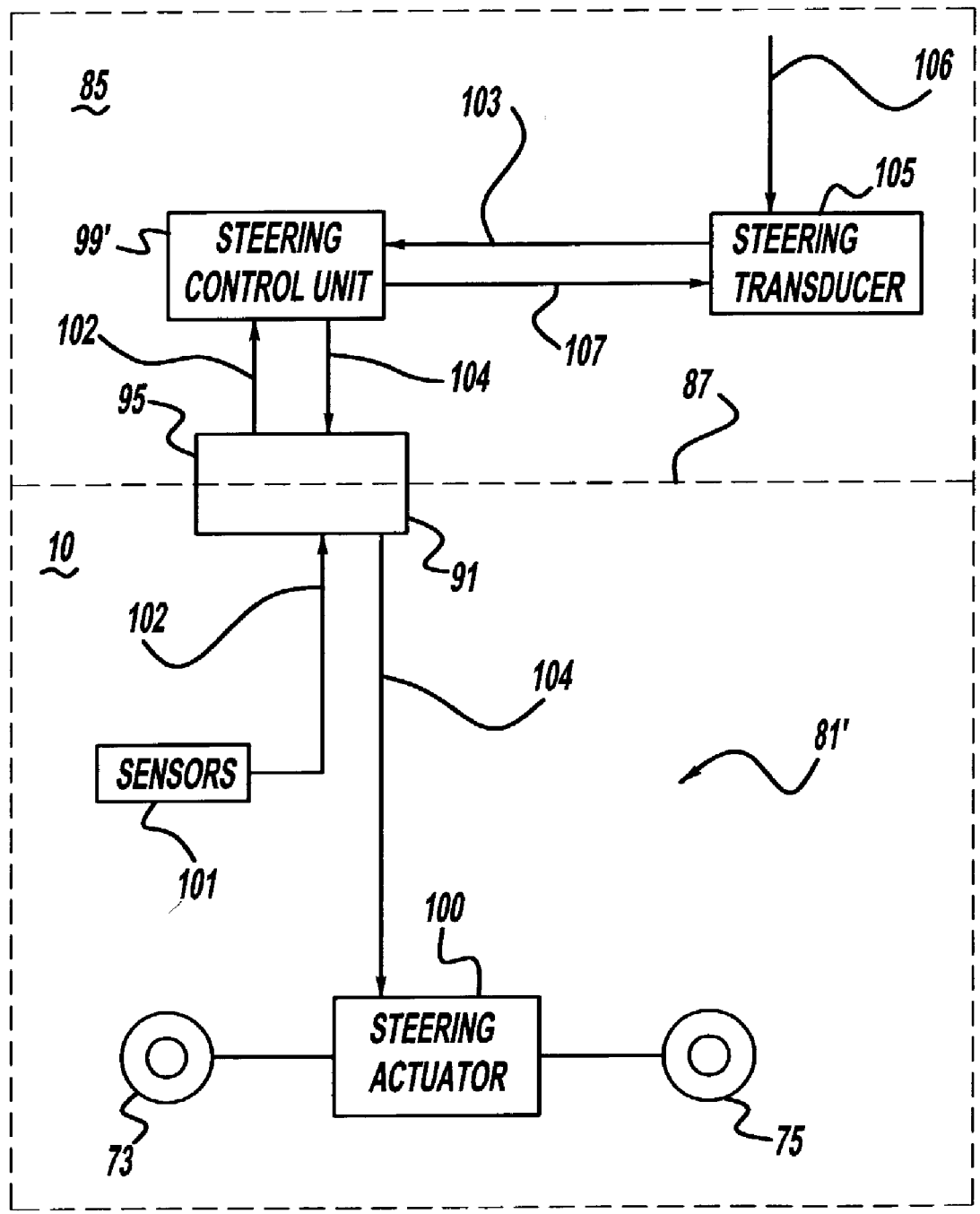
FIG. 7 is a schematic illustration of an alternative steering system for use in the rolling platform and body pod of FIG. 4.
Figure 8:
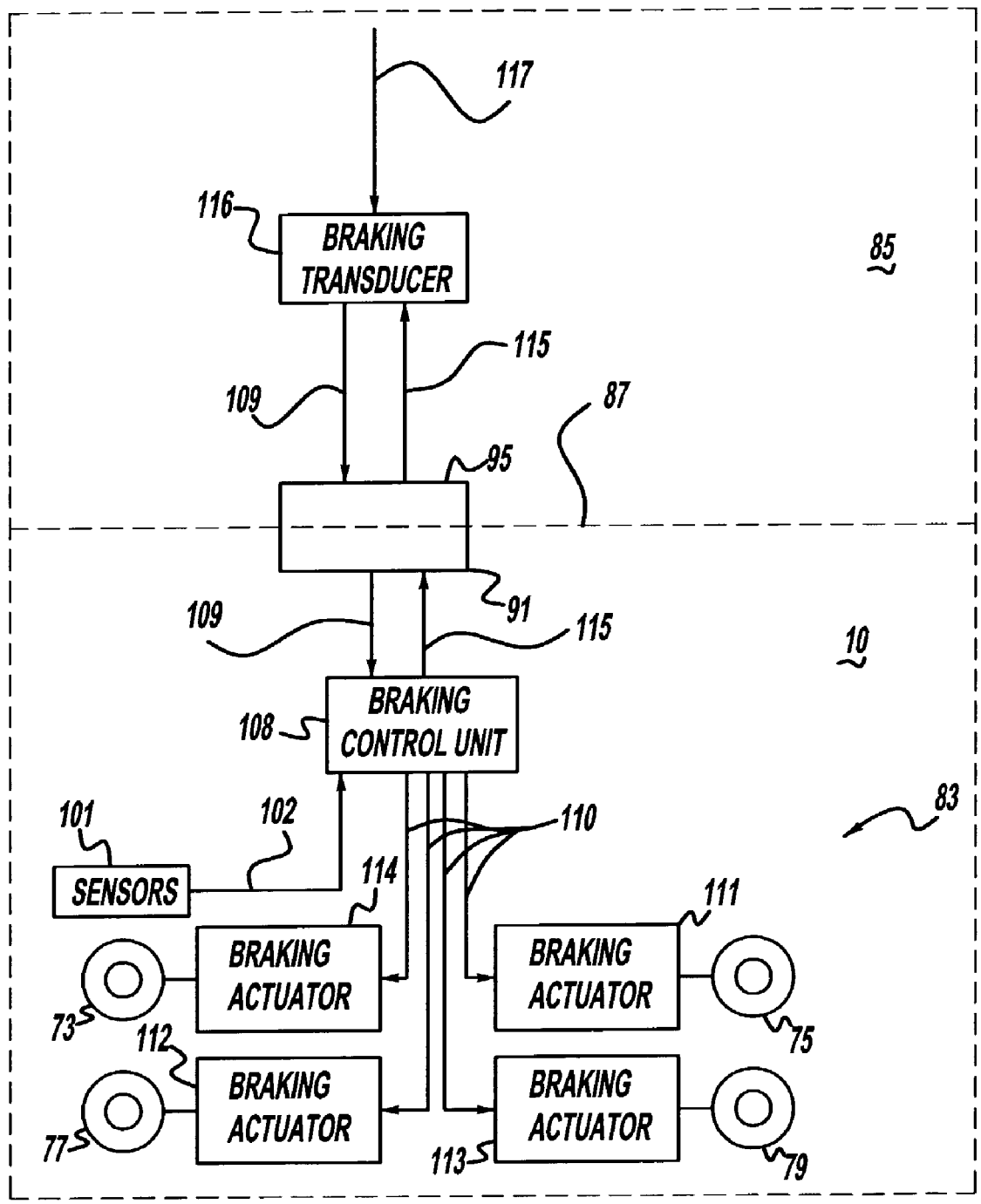
FIG. 8 is a schematic illustration of a braking system for use with the rolling platform and body pod of FIG. 4.
Figure 9:
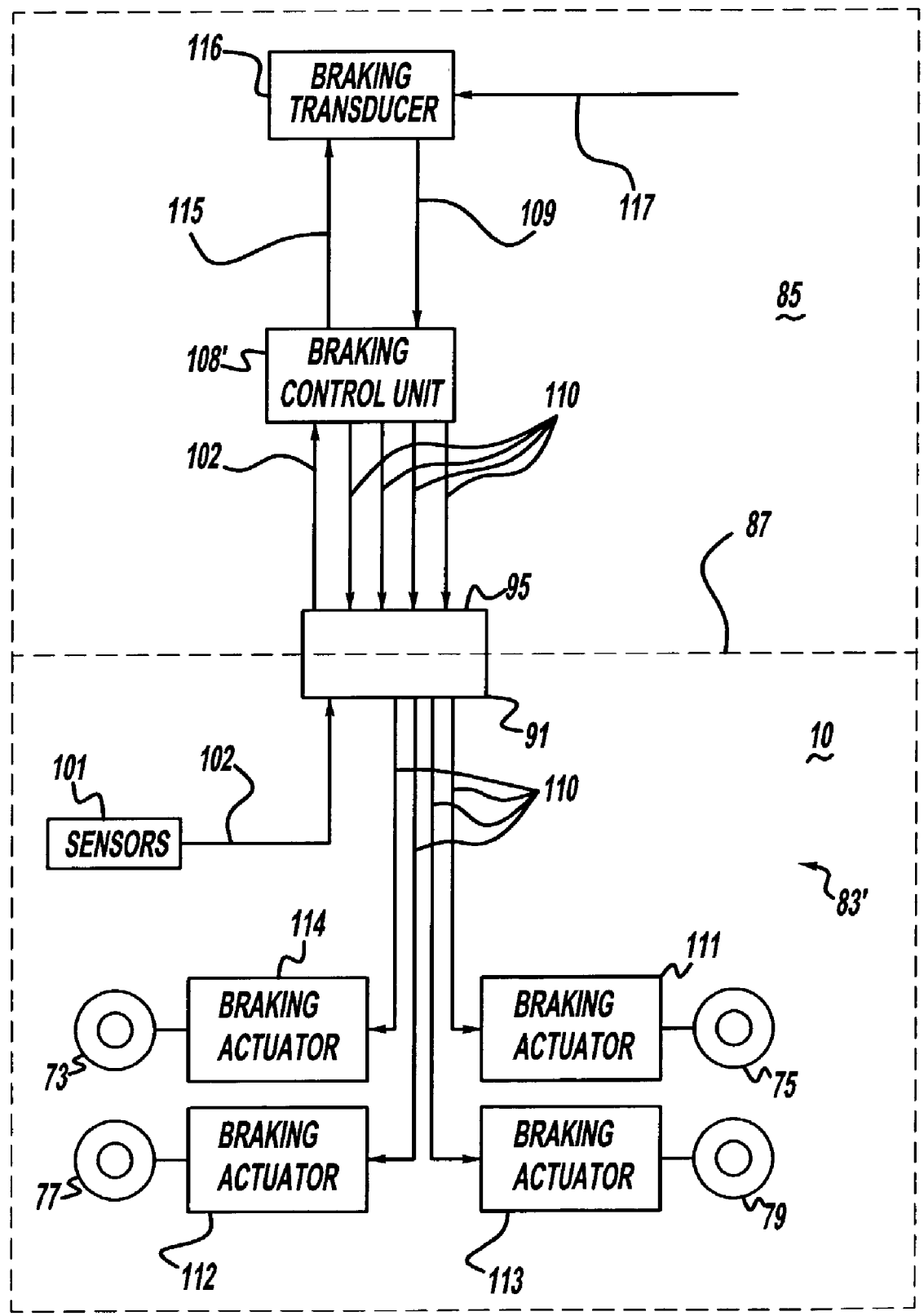
FIG. 9 is a schematic illustration of an alternative braking system for use with the rolling platform and body pod of FIG. 4.

An alternative brake-by-wire system 83' within the scope of the claimed invention is depicted in FIG. 9, wherein like reference numbers refer to like components from FIGS. 6-8. The braking actuators 111, 112, 113, 114 and sensors 101 are connected directly to the electrical connector 91. In this embodiment, a braking control unit 108' may be located in an attached vehicle body 85. A braking transducer 116 transmits electrical braking control signals 109 to the braking control unit 108', and the braking control unit 108' transmits braking actuator signals 109 to the braking actuators 111, 112, 113, 114 via the electrical connector 91.

Examples of brake-by-wire systems are described in U.S. Pat. No. 5,366,281, issued Nov. 22, 2994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Referring again to FIG. 1, the energy storage system 69 stores energy that is used to propel the chassis 10. For most applications, the stored energy will be in chemical form. Examples of energy storage systems 69 include fuel tanks and electric batteries. In the embodiment shown in FIG. 1, the energy storage system 69 includes two compressed gas cylinder storage tanks 121 (5,000 psi, or 350 bars) mounted within the mid-chassis space 41 and configured to store compressed hydrogen gas. Employing more than two compressed gas cylinder storage tanks may be desirable to provide greater hydrogen storage capacity. Instead of compressed gas cylinder storage tanks 121, an alternate form of hydrogen storage may be employed such as metal or chemical hydrides. Hydrogen generation or reforming may also be used.

The energy conversion system 67 converts the energy stored by the energy storage system 69 to mechanical energy that propels the chassis 10. In the preferred embodiment, depicted in FIG. 1, the energy conversion system 67 includes a fuel cell stack 125 located in the rear axle area 18, and an electric traction motor 127 located in the front axle area 16. The fuel cell stack 125 produces a continuously available power of 94 kilowatts. Fuel cell systems for vehicular use are described in U.S. Pat. No. 6,195,999, issued Mar. 6, 2001 to General Motors Corporation; U.S. Pat. No. 6,223,843, issued May 1, 2001 to General Motors Corporation; U.S. Pat. No. 6,321,145, issued Nov. 20, 2001 to Delphi Technologies, Inc.; and U.S. Pat. No. 6,394,207, issued May 28, 2002 to General Motors Corporation; which are hereby incorporated by reference in their entireties.

The fuel cell stack 125 is operably connected to the compressed gas cylinder storage tanks 121 and to the traction motor 127. The fuel cell stack 125 converts chemical energy in the form of hydrogen from the compressed gas cylinder storage tanks 121 into electrical energy, and the traction motor 127 converts the electrical energy to mechanical energy, and applies the mechanical energy to rotate the front wheels 73, 75. Optionally, the fuel cell stack 125 and traction motor 127 are switched between the front axle area 16 and rear axle area 18. Optionally, the energy conversion system includes an electric battery (not shown) in hybrid combination with the fuel cell to improve chassis acceleration. Other areas provided between the structural elements are useful for housing other mechanisms and systems for providing the functions typical of an automobile as shown in FIGS. 2 and 3. Those skilled in the art will recognize other energy conversion systems 67 that may be employed within the scope of the present invention.

Figure 10:
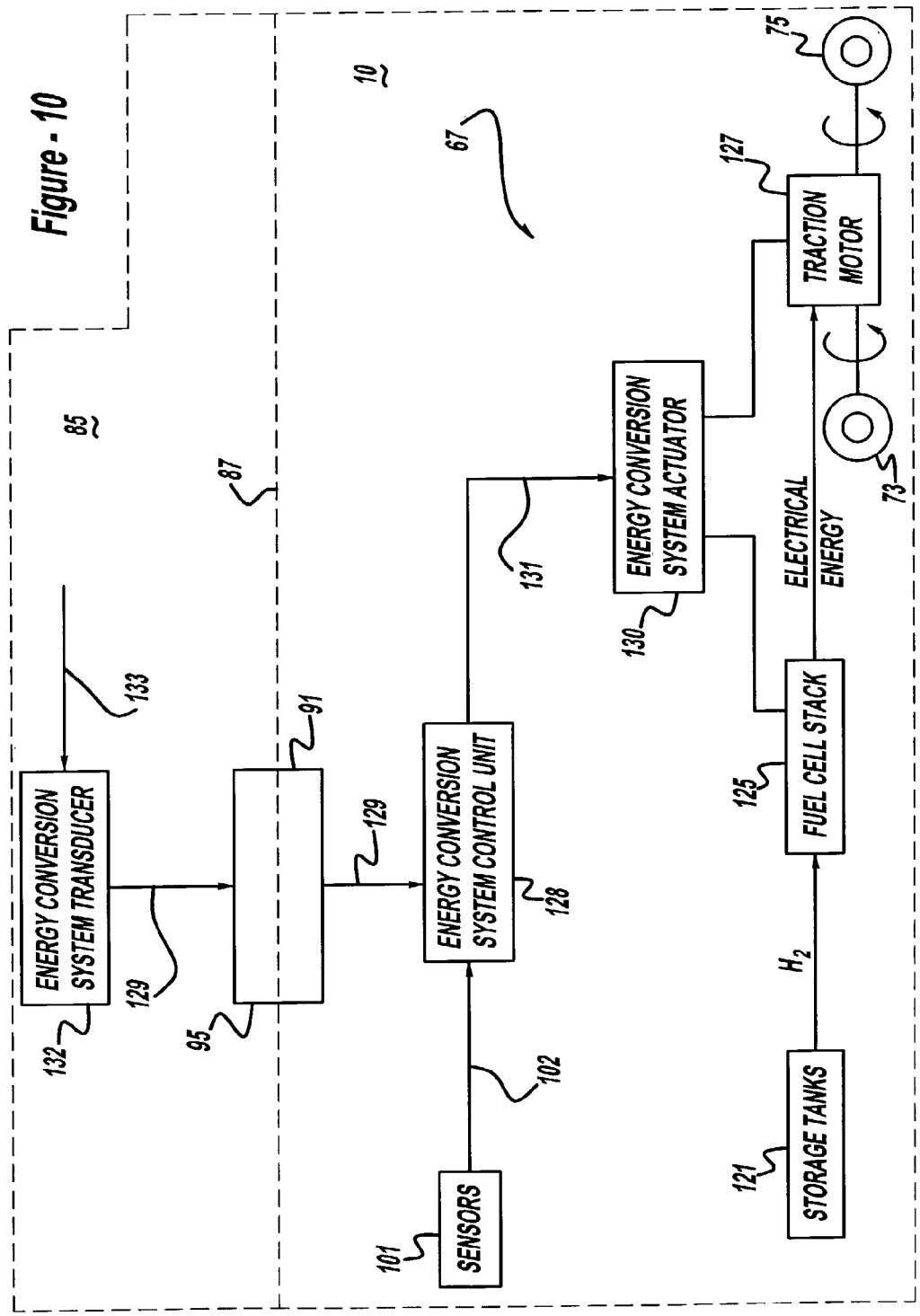
FIG. 10 is a schematic illustration of an energy conversion system for use with the rolling platform and body pod of FIG. 4.

The energy conversion system 67 is configured to respond to non-mechanical control signals. The energy conversion system 67 of the preferred embodiment is controllable by-wire, as depicted in FIG. 10. An energy conversion system control unit 128 is connected to the electrical connector 91 from which it receives electrical energy conversion system control signals 129, and sensors 101 from which it receives sensor signals 102 carrying information about various chassis conditions. In the preferred embodiment, the information conveyed by the sensor signals 102 to the energy conversion system control unit 128 includes chassis velocity, electrical current applied, rate of acceleration of the chassis, and motor shaft speed to ensure smooth launches and controlled acceleration. The energy conversion system control unit 128 is connected to an energy conversion system actuator 130, and transmits energy conversion system actuator control signals 131 to the energy conversion system actuator 130 in response to the electrical energy conversion system control signals 129 and sensor signals 102 according to a stored algorithm. The energy conversion system actuator 130 acts on the fuel cell stack 125 or traction motor 127 to adjust energy output. Those skilled in the art will recognize the various methods by which the energy conversion system actuator 130 may adjust the energy output of the energy conversion system. For example, a solenoid may alternately open and close a valve that regulates hydrogen flow to the fuel cell stack. Similarly, a compressor that supplies oxygen (from air) to the fuel cell stack may function as an actuator, varying the amount of oxygen supplied to the fuel cell stack in response to signals from the energy conversion system control unit.

An energy conversion system transducer 132 may be located on a vehicle body 85 and connected to a complementary electrical connector 95 engaged with the electrical connector 91. The energy conversion system transducer 132 is configured to convert mechanical energy conversion system control signals 133 to electrical energy conversion system control signals 129.

Figure 11:
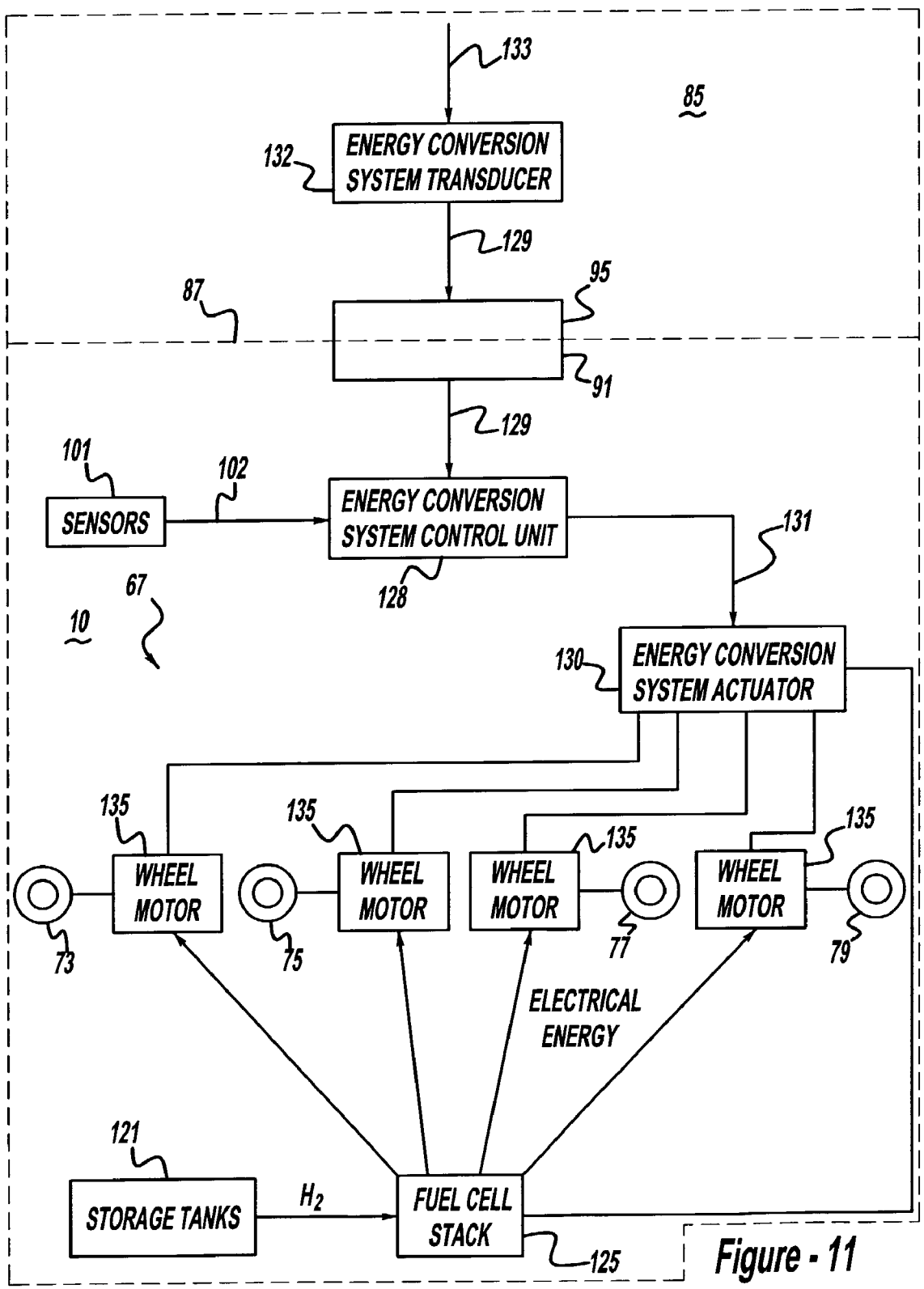
FIG. 11 is a schematic illustration of an alternative energy conversion system for use with the rolling platform and body pod of FIG. 4.

In another embodiment of the invention, as shown schematically in FIG. 11, wherein like reference numbers refer to like components from FIGS. 6-10, wheel motors 135, also known as wheel hub motors, are positioned at each of the four wheels 73, 75, 77, 79. Optionally, wheel motors 135 may be provided at only the front wheels 73, 75 or only the rear wheels 77, 79. The use of wheel motors 135 reduces the height of the chassis 10 compared to the use of traction motors, and therefore may be desirable for certain uses.

Referring again to FIG. 2, a conventional heat exchanger 137 and electric fan system 139, operably connected to the fuel cell stack 125 to circulate coolant for waste heat rejection, is carried in an opening that exists between the rear axle area 18 and the structural elements 54, 60. The heat exchanger 137 is set at an inclined angle to reduce its vertical profile, but to provide adequate heat rejection it also extends slightly above the top of elements 12, 26 (as seen in FIG. 4). Although the fuel cell stack 125, heat exchanger 137 and electric fan system 139 extend above the structural elements, their protrusion into the body pod space is relatively minor when compared to the engine compartment requirements of a conventionally designed automobile, especially when the chassis height of the preferred embodiment is approximately a mere 15 inches (28 centimeters). Optionally, the heat exchanger 137 is packaged completely within the chassis' structure with airflow routed through channels (not shown).

Referring again to FIG. 1, the suspension system 71 is mounted to the structural frame 11 and is connected to four wheels 73, 75, 77, 79. Those skilled in the art will understand the operation of a suspension system, and recognize that a multitude of suspension system types may be used within the scope of the claimed invention. The suspension system 71 of the preferred embodiment of the invention is electronically controlled, as depicted schematically in FIG. 12.

Figure 12:
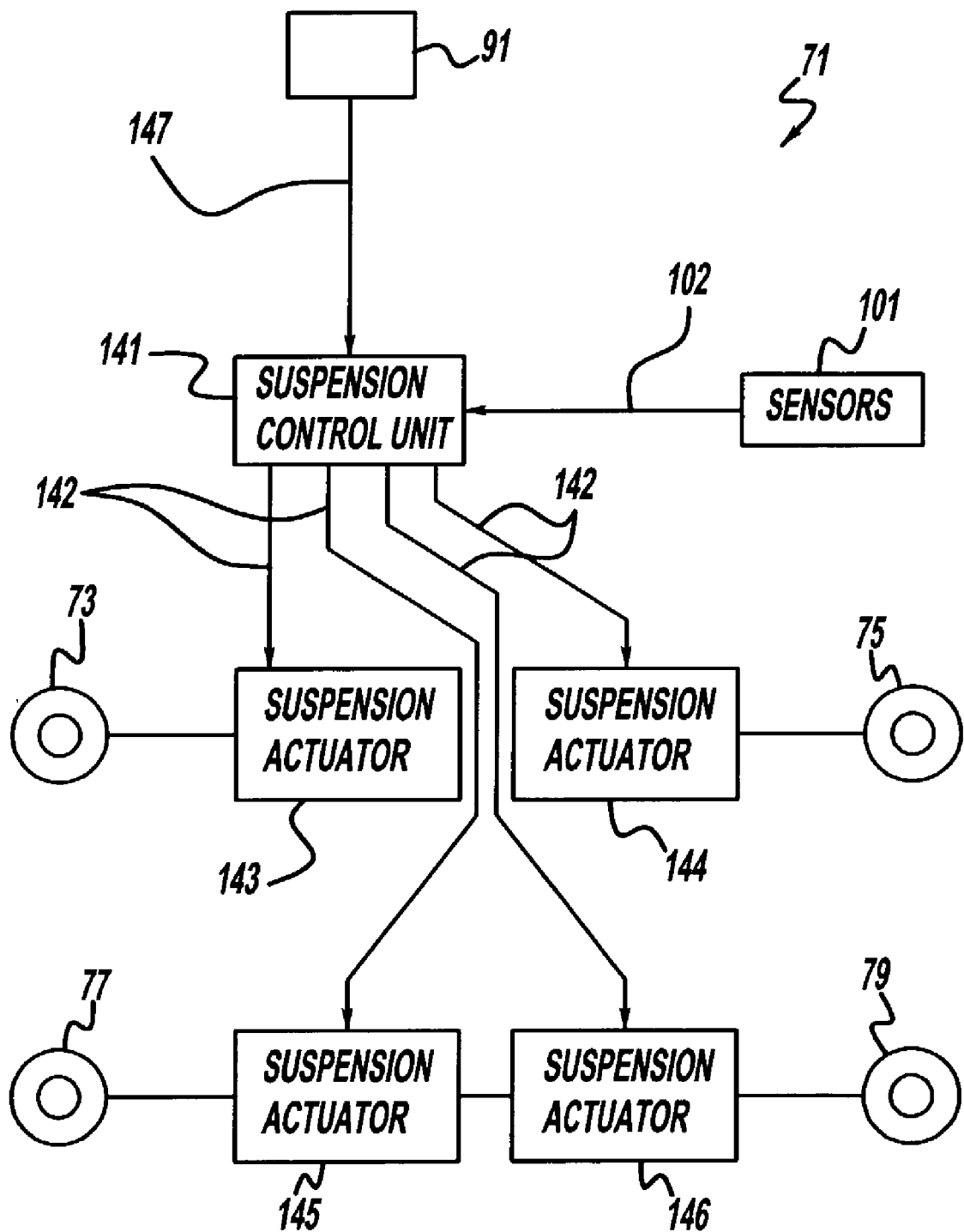
FIG. 12 is a schematic illustration of a suspension system for use with the rolling platform of FIGS. 1-5.

Referring to FIG. 12, the behavior of the electronically controlled suspension system 71 in response to any given road input is determined by a suspension control unit 141. Sensors 101 located on the chassis 10 monitor various conditions such as vehicle speed, angular wheel velocity, and wheel position relative to the chassis 10. The sensors 101 transmit the sensor signals 102 to the suspension control unit 141. The suspension control unit 141 processes the sensor signals 102 and generates suspension actuator control signals 142 according to a stored algorithm. The suspension control unit 141 transmits the suspension actuator control signals 142 to four suspension actuators 143, 144, 145, 146. Each suspension actuator 143, 144, 145, 146 is operably connected to a wheel 73, 75, 77, 79 and determines, in whole or in part, the position of the wheel 73, 75, 77, 79 relative to the chassis 10. The suspension actuators of the preferred embodiment are variable-force, real time, controllable dampers. The suspension system 71 of the preferred embodiment is also configured such that chassis ride height is adjustable. Separate actuators may be used to vary the chassis ride height.

In the preferred embodiment, the suspension control unit 141 is programmable and connected to the electrical connector 91 of the body-attachment interface 87. A vehicle user is thus able to alter suspension system 71 characteristics by reprogramming the suspension control unit 141 with suspension system software 147 via the electrical connector 91.

Figure 13:
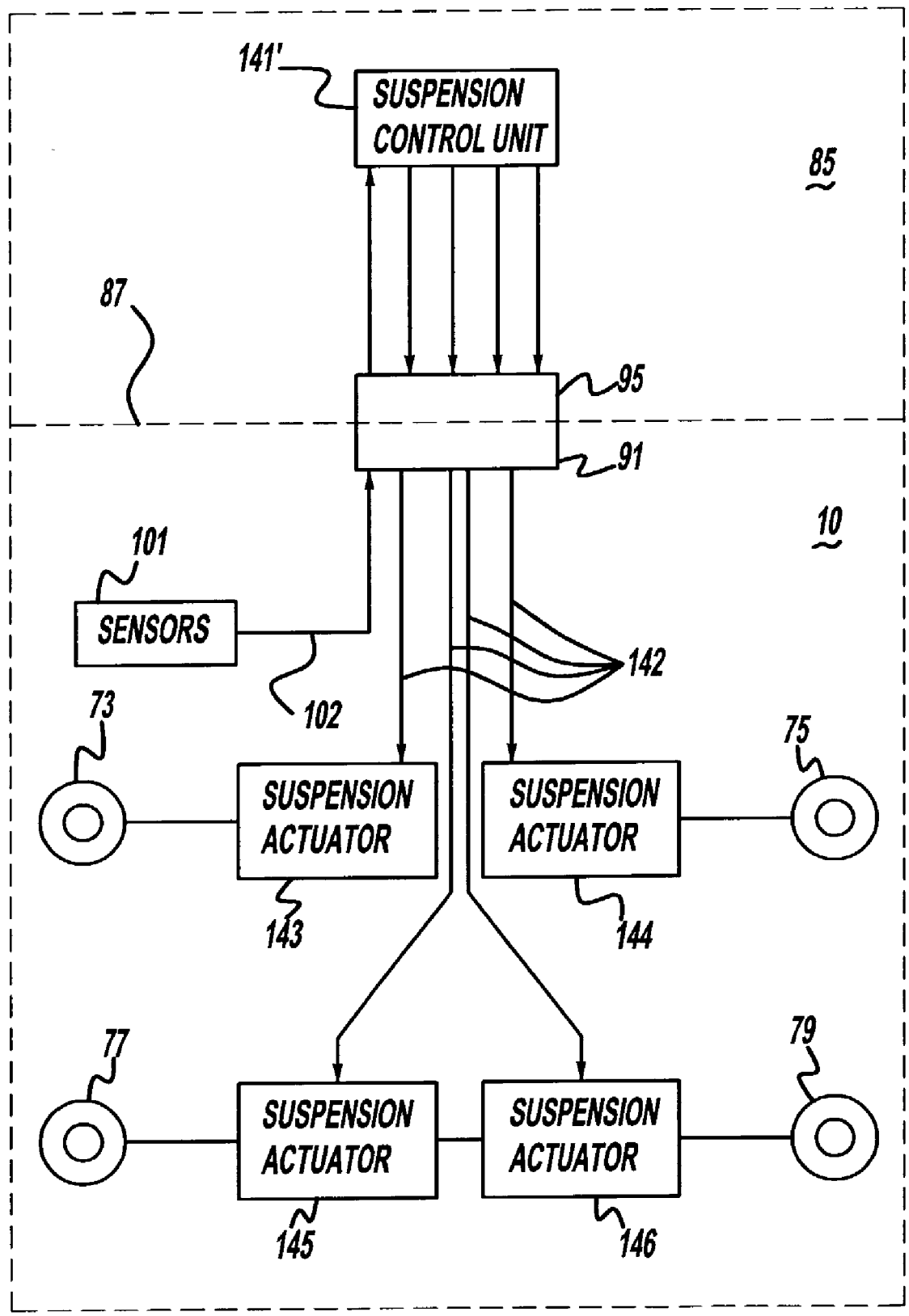
FIG. 13 is a schematic illustration of an alternative suspension system for use with the rolling platform and body pod of FIG. 4.

In the context of the claimed invention, electronically-controlled suspension systems include suspension systems without a suspension control unit located on the chassis 10. Referring to FIG. 13, wherein like reference numbers are used to reference like components from FIG. 12, suspension actuators 143, 144, 145, 146 and suspension sensors 101 are connected directly to the electrical connector 91. In such an embodiment, a suspension control unit 141' located on an attached vehicle body 85 can process sensor signals 102 transmitted through the electrical connector 91, and transmit suspension actuator control signals 142 to the suspension actuators 143, 144, 145, 146 via the electrical connector 91.

Examples of electronically controlled suspension systems are described in U.S. Pat. No. 5,606,503, issued Feb. 25, 1997 to General Motors Corporation; U.S. Pat. No. 5,609,353, issued Mar. 11, 1997 to Ford Motor Company; and U.S. Pat. No. 6,397,134, issued May 28, 2002 to Delphi Technologies, Inc.; which are hereby incorporated by reference in their entireties.

U.S. Pat. No. 6,397,134 describes an electronically controlled suspension system that provides improved suspension control through steering crossover events. In particular, the system senses a vehicle lateral acceleration and a vehicle steering angle and stores, for each direction of sensed vehicle lateral acceleration, first and second sets of enhanced suspension actuator control signals for the suspension actuators of the vehicle. Responsive to the sensed vehicle lateral acceleration and sensed vehicle steering angle, the system applies the first set of enhanced actuator control signals to the suspension actuators if the sensed steering angle is in the same direction as the sensed lateral acceleration and alternatively applies the second set of enhanced actuator control signals to the suspension actuators if the sensed steering angle is in the opposite direction as the sensed lateral acceleration.

U.S. Pat. No. 5,606,503 describes a suspension control system for use in a vehicle including a suspended vehicle body, four un-suspended vehicle wheels, four variable force actuators mounted between the vehicle body and wheels, one of the variable force actuators at each corner of the vehicle, and a set of sensors providing sensor signals indicative of motion of the vehicle body, motion of the vehicle wheels, a vehicle speed and an ambient temperature. The suspension control system comprises a microcomputer control unit including: means for receiving the sensor signals; means, responsive to the sensor signals, for determining an actuator demand force for each actuator; means, responsive to the vehicle speed, for determining a first signal indicative of a first command maximum; means, responsive to the ambient temperature, for determining a second signal indicative of a second command maximum; and means for constraining the actuator demand force so that it is no greater than a lesser of the first and second command maximums.

Electrically conductive wires (not shown) are used in the preferred embodiment to transfer signals between the chassis 10 and an attached body 85, and between transducers, control units, and actuators. Those skilled in the art will recognize that other non-mechanical means of sending and receiving signals between a body and a chassis, and between transducers, control units, and actuators may be employed and fall within the scope of the claimed invention. Other non-mechanical means of sending and receiving signals include radio waves and fiber optics.

The by-wire systems are networked in the preferred embodiment, in part to reduce the quantity of dedicated wires connected to the electrical connector 91. A serial communication network is described in U.S. Pat. No. 5,534,848, issued Jul. 9, 1996 to General Motors Corporation, which is hereby incorporated by reference in its entirety. An example of a networked drive-by-wire system is described in U.S. Patent Application Publication No. U.S. 2001/0029408, Serial No. 09/775,143, which is hereby incorporated by reference in its entirety. Those skilled in the art will recognize various networking devices and protocols that may be used within the scope of the claimed invention, such as SAE J1850 and CAN ("Controller Area Network"). A TTP ("Time Triggered Protocol") network is employed in the preferred embodiment of the invention for communications management.

Figure 14:
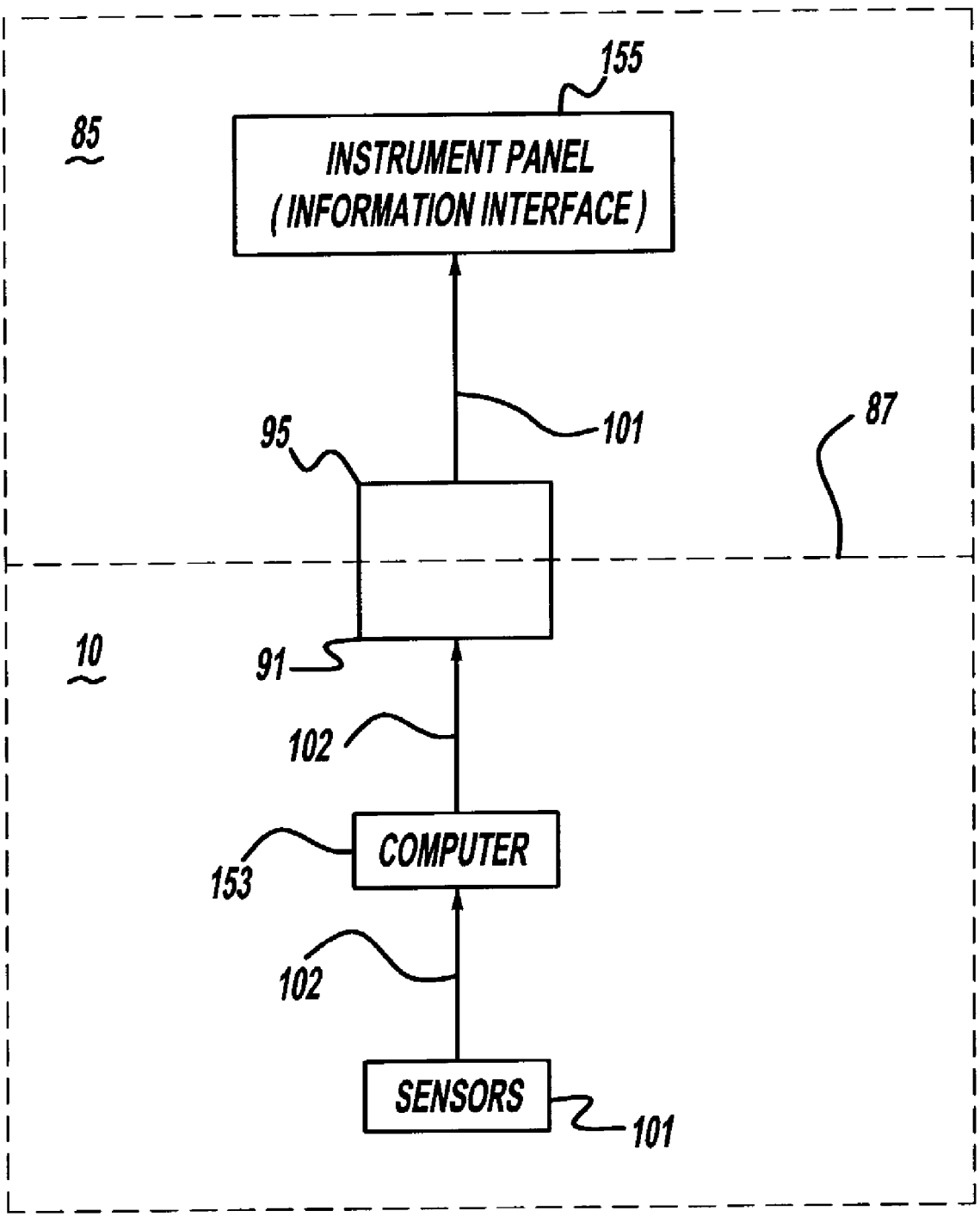
FIG. 14 is a schematic illustration of a chassis computer and chassis sensors for use with the rolling platform and body pod of FIG. 4.

Some of the information collected by the sensors 101, such as chassis velocity, fuel level, and system temperature and pressure, is useful to a vehicle driver for operating the chassis and detecting system malfunctions. As shown in FIG. 14, the sensors 101 are connected to the electrical connector 91 through a chassis computer 153. Sensor signals 102 carrying information are transmitted from the sensors 101 to the chassis computer 153, which processes the sensor signals 102 according to a stored algorithm. The chassis computer 153 transmits the sensor signals 102 to the electrical connector 91 when, according to the stored algorithm, the sensor information is useful to the vehicle driver. For example, a sensor signal 102 carrying temperature information is transmitted to the electrical connector 91 by the chassis computer 153 when the operating temperature of the chassis 10 is unacceptably high. A driver-readable information interface 155 may be attached to a complementary electrical connector 95 coupled with the electrical connector 91 and display the information contained in the sensor signals 102. Driver-readable information interfaces include, but are not limited to, gauges, meters, LED displays, and LCD displays. The chassis may also contain communications systems, such as antennas and telematics systems, that are operably connected to an electrical connector in the body-attachment interface and configured to transmit information to an attached vehicle body.

Figure 15:
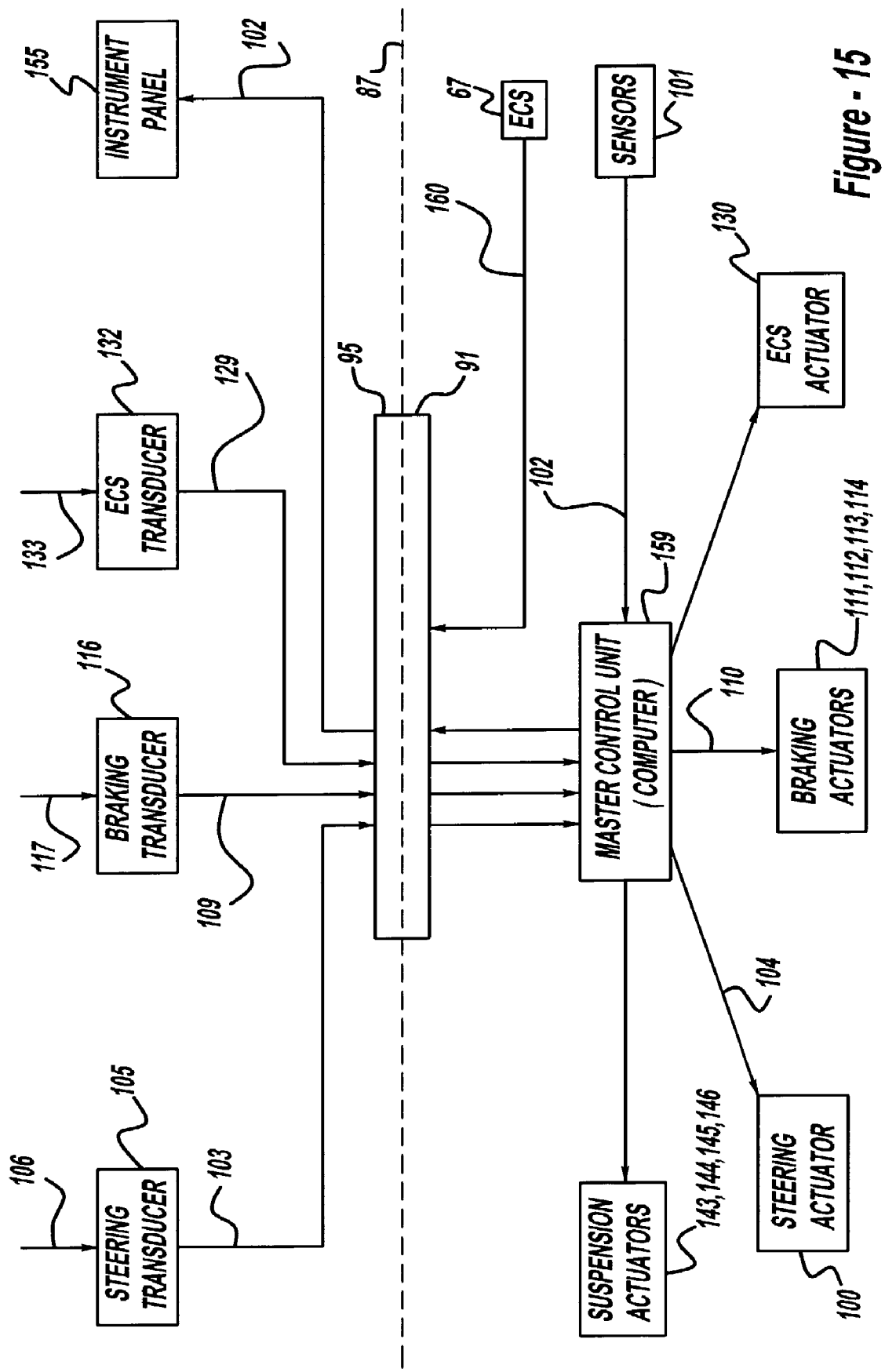
FIG. 15 is a schematic illustration of a master control unit with a suspension system, braking system, steering system, and energy conversion system for use with the rolling platform and body pod of FIG. 4.

One control unit may serve multiple functions. For example, as shown in FIG. 15, a master control unit 159 functions as the steering control unit, braking control unit, suspension control unit, and energy conversion system control unit.

Referring again to FIG. 15, the energy conversion system 67 is configured to transmit electrical energy 160 to the electrical connector 91 to provide electric power for systems located on an attached vehicle body, such as power windows, power locks, entertainment systems, heating, ventilating, and air conditioning systems, etc. Optionally, if the energy storage system 69 includes a battery, then the battery may be connected to the electrical connector 91. In the preferred embodiment, the energy conversion system 67 includes a fuel cell stack that generates electrical energy and is connected to the electrical connector 91.

Figure 16:
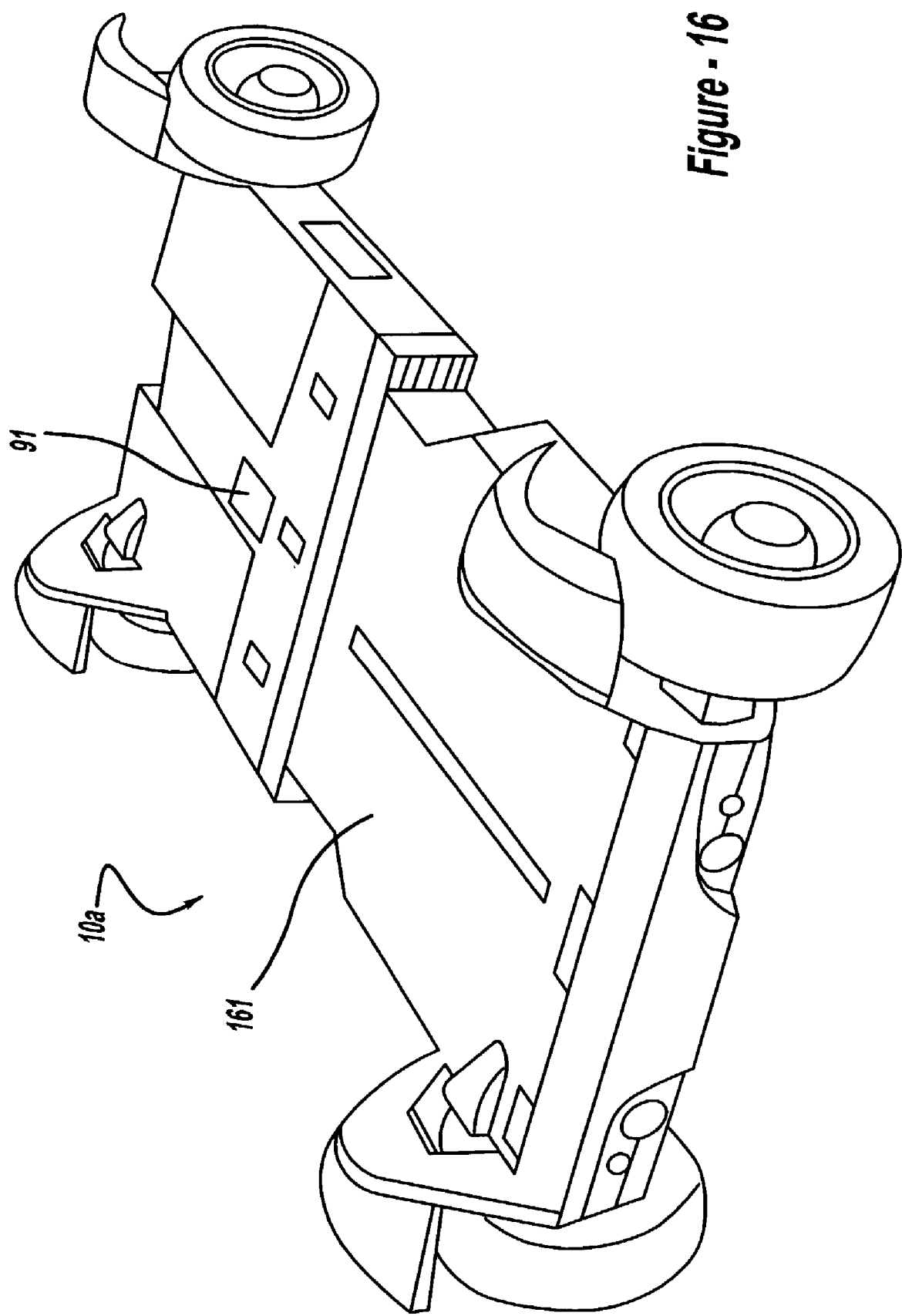
FIG. 16 is a perspective illustration of a skinned rolling platform according to a further embodiment of the present invention.
Figure 17:
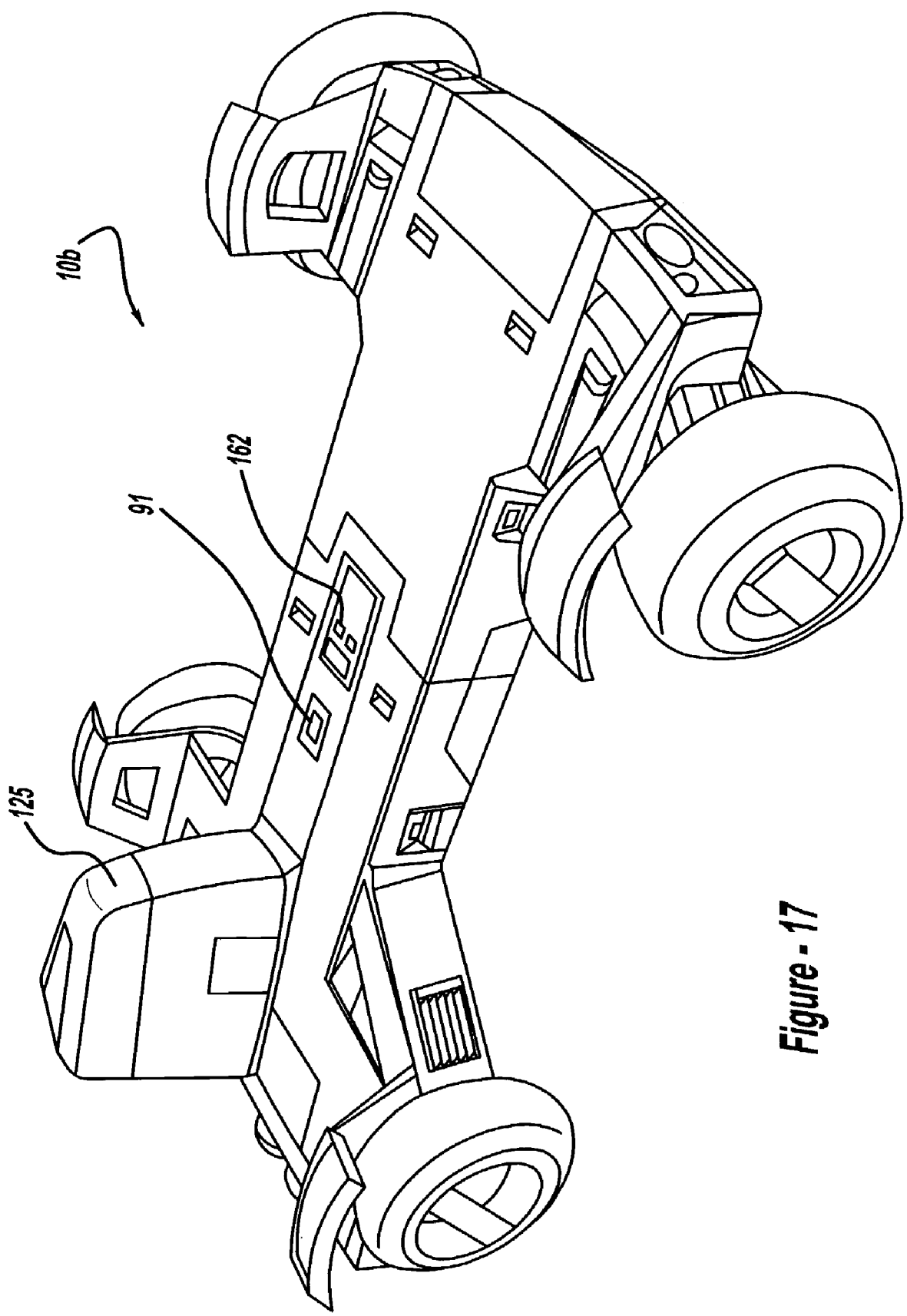
FIG. 17 is a perspective illustration of a skinned rolling platform according to another embodiment of the present invention.

FIG. 16 shows a chassis 10 with rigid covering, or "skin," 161 and an electrical connector or coupling 91 that functions as an umbilical port. The rigid covering 161 may be configured to function as a vehicle floor, which is useful if an attached vehicle body 85 does not have a lower surface. In FIG. 17, a similarly equipped chassis 10 is shown with an optional vertical fuel cell stack 125. The vertical fuel cell stack 125 protrudes significantly into the body pod space which is acceptable for some applications. The chassis 10 also includes a manual parking brake interface 162 that may be necessary for certain applications and therefore is also optionally used with other embodiments.

Figure 18:
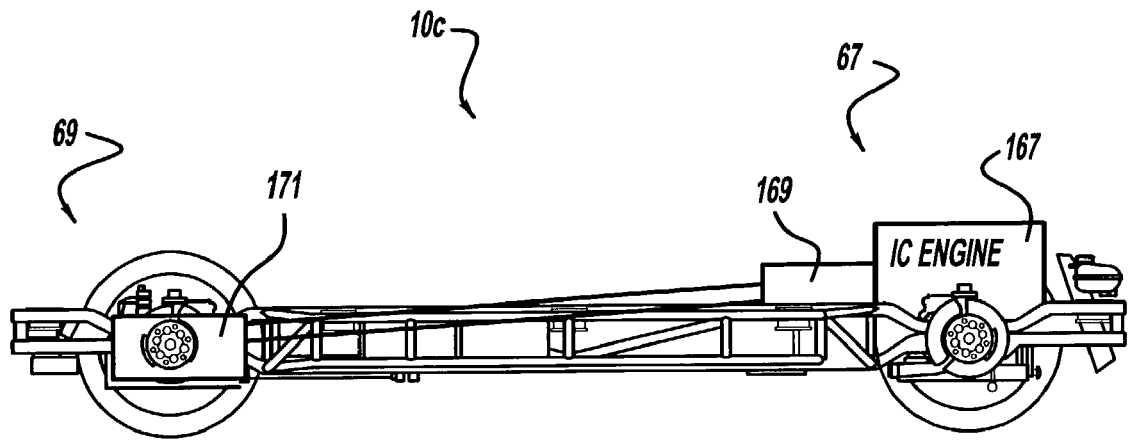
FIG. 18 is a side schematic illustration of a rolling platform with an energy conversion system including an internal combustion engine, and gasoline tanks.

FIG. 18 depicts an embodiment of the invention that may be advantageous in some circumstances. The energy conversion system 67 includes an internal combustion engine 167 with horizontally-opposed cylinders, and a transmission 169. The energy storage system 69 includes a gasoline tank 171.

Figure 19:
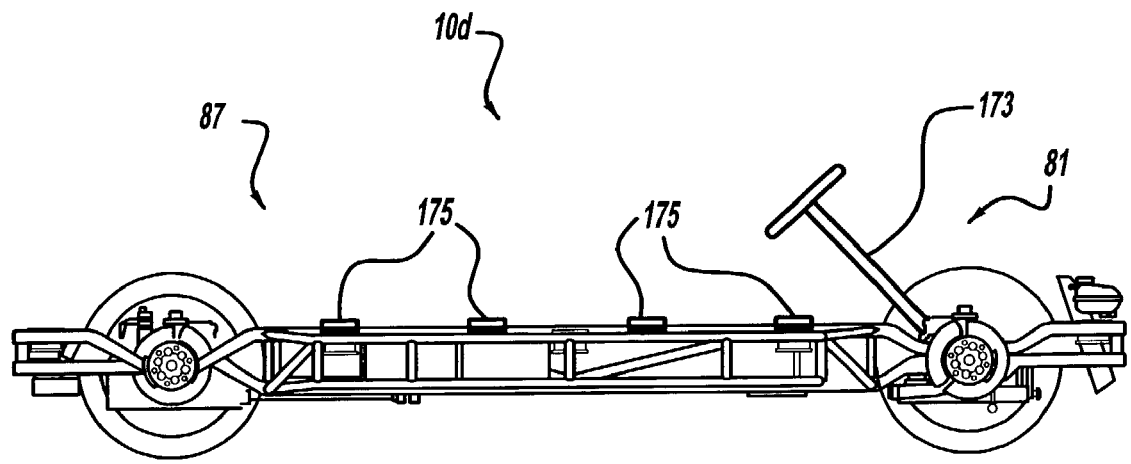
FIG. 19 is a side schematic illustration of a rolling platform according to another embodiment of the invention, with a mechanical steering linkage and passenger seating attachment couplings.

FIG. 19 depicts an embodiment of the invention wherein the steering system 81 has mechanical control linkages including a steering column 173. Passenger seating attachment couplings 175 are present on the body attachment interface 87, allowing the attachment of passenger seating assemblies to the chassis 10.

Figures 20, 20A:
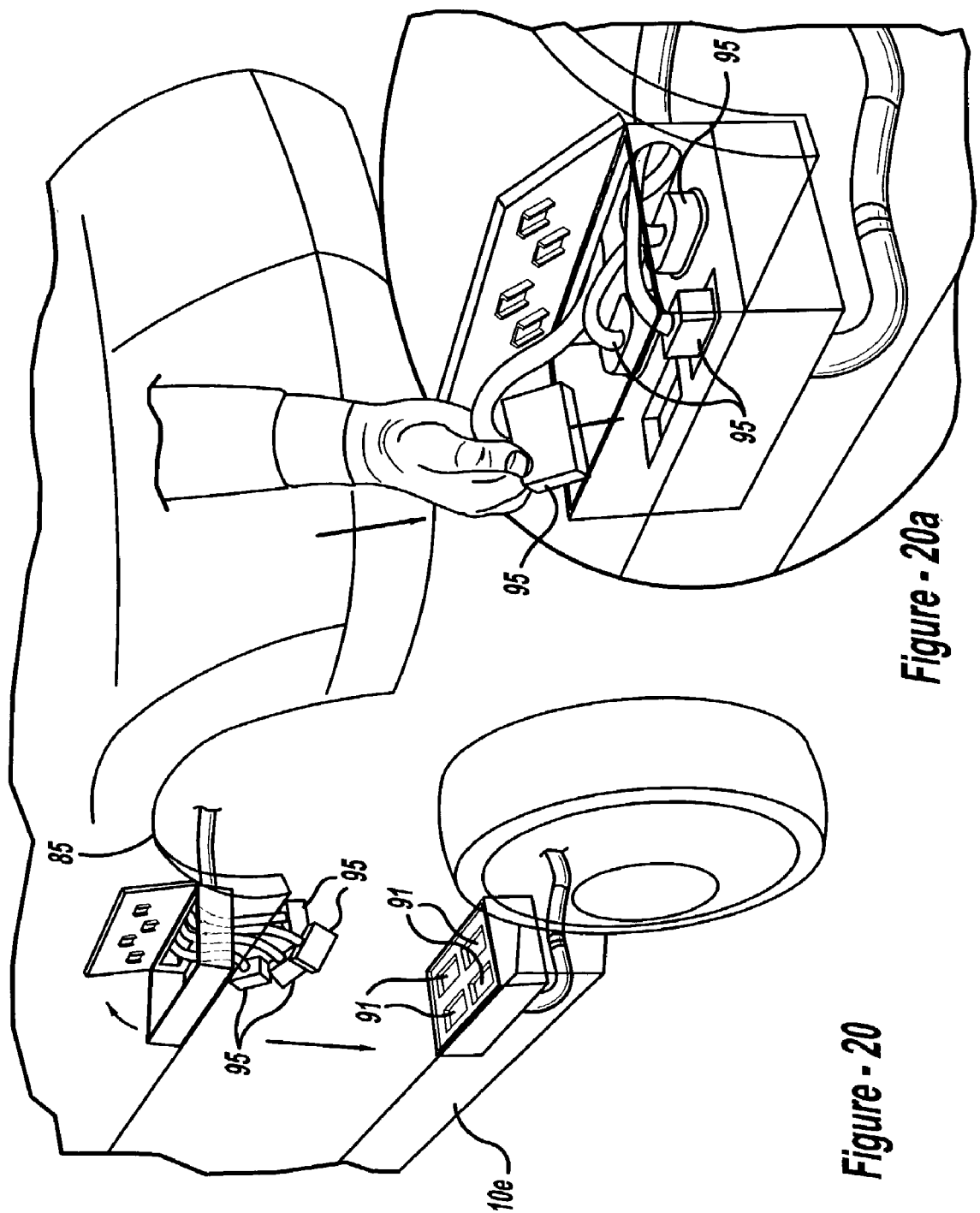
FIGS. 20 and 20a show partial exploded perspective schematic illustrations of a rolling platform according to a further embodiment of the invention in an attachment scenario with a body pod, the rolling platform having multiple electrical connectors engageable with complementary electrical connectors in the body pod.

FIGS. 20 and 20a depict a chassis 10 within the scope of the invention and a body 85 each having multiple electrical connectors 91 and multiple complementary electrical connectors 95, respectively. For example, a first electrical connector 91 may be operably connected to the steering system and function as a control signal receiver. A second electrical connector 91 may be operably connected to the braking system and function as a control signal receiver. A third electrical connector 91 may be operably connected to the energy conversion system and function as a control signal receiver. A fourth electrical connector 91 may be operably connected to the energy conversion system and function as an electrical power connector. Four multiple wire in-line connectors and complementary connectors are used in the embodiment shown in FIGS. 20 and 20a. FIG. 20a depicts an assembly process for attaching corresponding connectors 91, 95.

Figure 21:
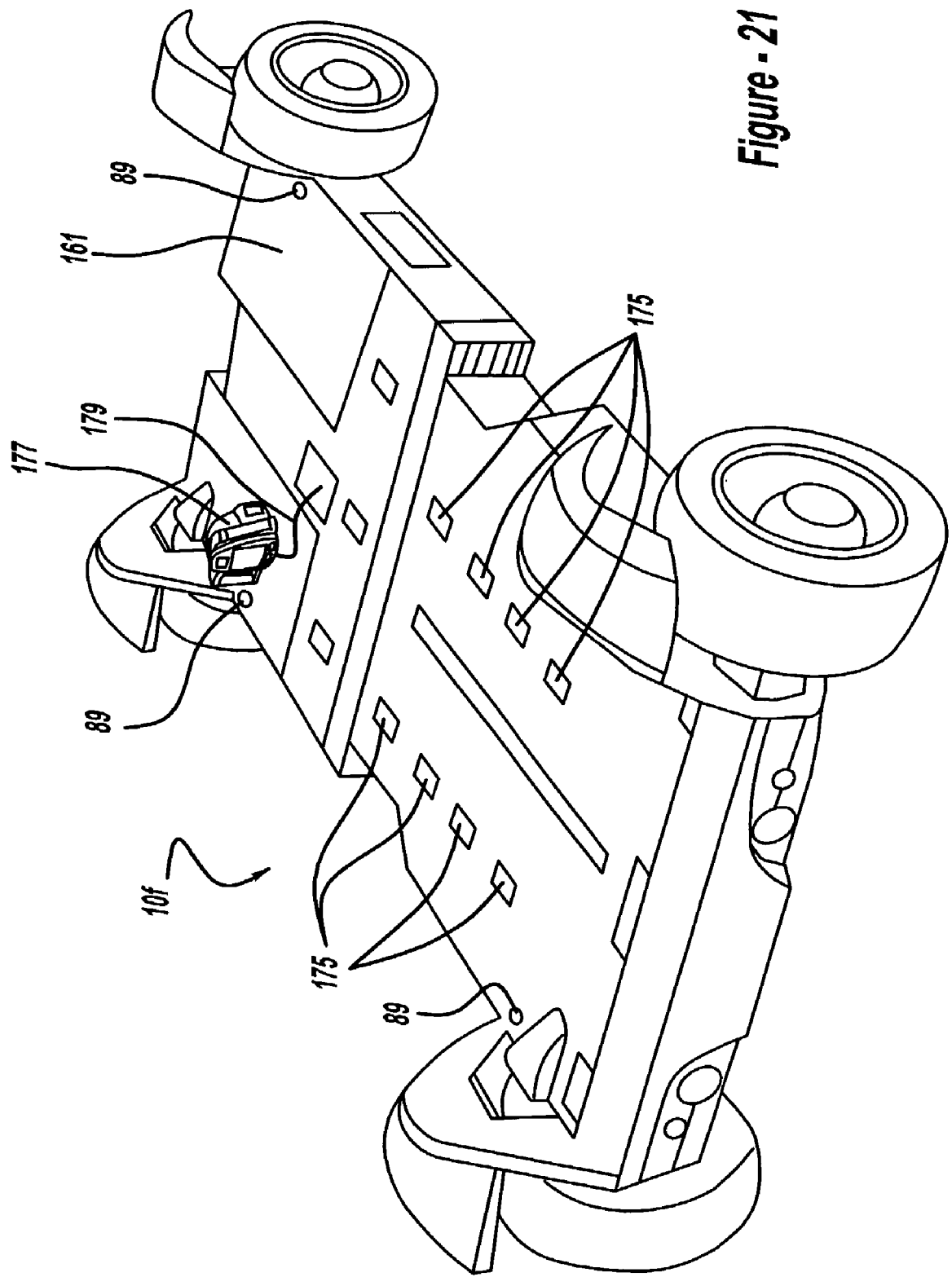
FIG. 21 is a perspective schematic illustration of a skinned rolling platform according to yet another embodiment of the invention, the rolling platform having a movable control input device.

Referring to FIG. 21, a further embodiment of the claimed invention is depicted. The chassis 10 has a rigid covering 161 and a plurality of passenger seating attachment couplings 175. A driver-operable control input device 177 containing a steering transducer, a braking transducer, and an energy conversion system transducer, is operably connected to the steering system, braking system, and energy conversion system by wires 179 and movable to different attachment points.

The embodiment depicted in FIG. 21 enables bodies of varying designs and configurations to mate with a common chassis design. A vehicle body without a lower surface but having complementary attachment couplings is matable to the chassis 10 at the load-bearing body retention couplings 89. Passenger seating assemblies may be attached at passenger seating attachment couplings 175.

Figure 22:
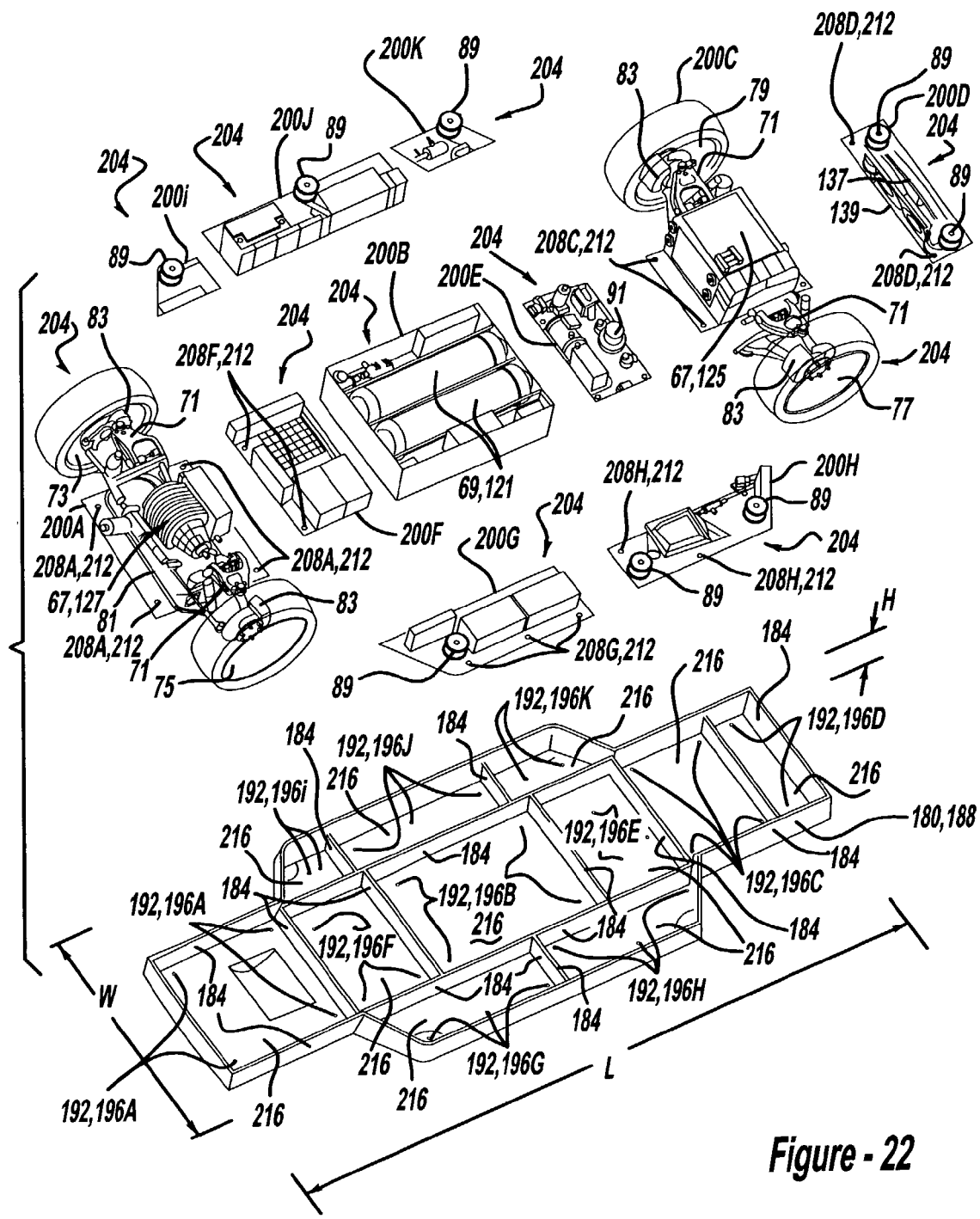
FIG. 22 is a perspective schematic illustration of preassembled modules and an alternative structural frame having frame interfaces.

Referring to FIG. 22, wherein like reference numbers refer to like components from FIGS. 1-3, a rigid sheet 180 having a plurality of formations 184 functions as an alternative structural frame 188. The rigid sheet 180 is preferably formed using sheet hydroforming, quick plastic forming, or superplastic forming. Quick plastic forming is described in U.S. Pat. No. 6,253,588, issued Jul. 3, 2001 to Rashid, et al, which is hereby incorporated by reference in its entirety. Superplastic forming is described in U.S. Pat. No. 5,974,847, issued Nov. 2, 1999 to Saunders, et al, which is hereby incorporated by reference in its entirety.

The formations 184 are configured to provide the sheet 180 with structural rigidity, and include integral rails and cross members. Any structural frame type or style may be employed with preassembled chassis modules within the scope of the claimed invention.

A plurality of locking or fastening elements 192 are mounted with respect to the structural frame 188 and define a first set of frame interfaces 196A-196K. In the context of the present invention, frame interfaces "mounted with respect to the structural frame" include frame interfaces that are or are not an integral part of a structural frame. Each frame interface 196A-196K is configured to mount a preassembled module with respect to the structural frame 188, and preferably includes at least two locking or fastening elements 192 in a predetermined spatial relationship with one another, hereinafter referred to as the "frame interface configuration." Those skilled in the art will recognize a variety of locking or fastening elements that may be employed within the scope of the claimed invention. In the embodiment depicted, the locking or fastening elements 192 forming the frame interfaces 196A-196K are holes in the rigid sheet 180 through which a threaded stud may be placed.

Preassembled modules 200A-200K may be advantageously employed to provide simplicity and flexibility in the assembly of rolling platforms. Preassembled modules 200A-

200K each include vehicular components 204, also referred to as "vehicular componentry." Preassembled module 200A includes front wheels 73, 75, suspension system 71 components, steering system 81 components, the electric motor 127 that is part of the energy conversion system 67, and braking system 83 components. Preassembled module 200B includes the compressed gas storage tanks 121 that are part of the energy storage system 69. Preassembled module 200C includes rear wheels 77, 79, suspension system 71 components, braking system 83 components, and the fuel cell stack 125 that partially forms the energy conversion system 67. Preassembled module 200D includes the heat exchanger 137 and electric fan system 139. Preassembled module 200E includes the electrical connector 91 and various components 204 for the braking system, steering system, and energy conversion system. Preassembled modules 200F, 200G, 200H, 200i include auxially energy conversion system components 204. Preassembled modules 200J, 200K include components 204 for a heating, ventilating, and air conditioning system.

Figure 23:
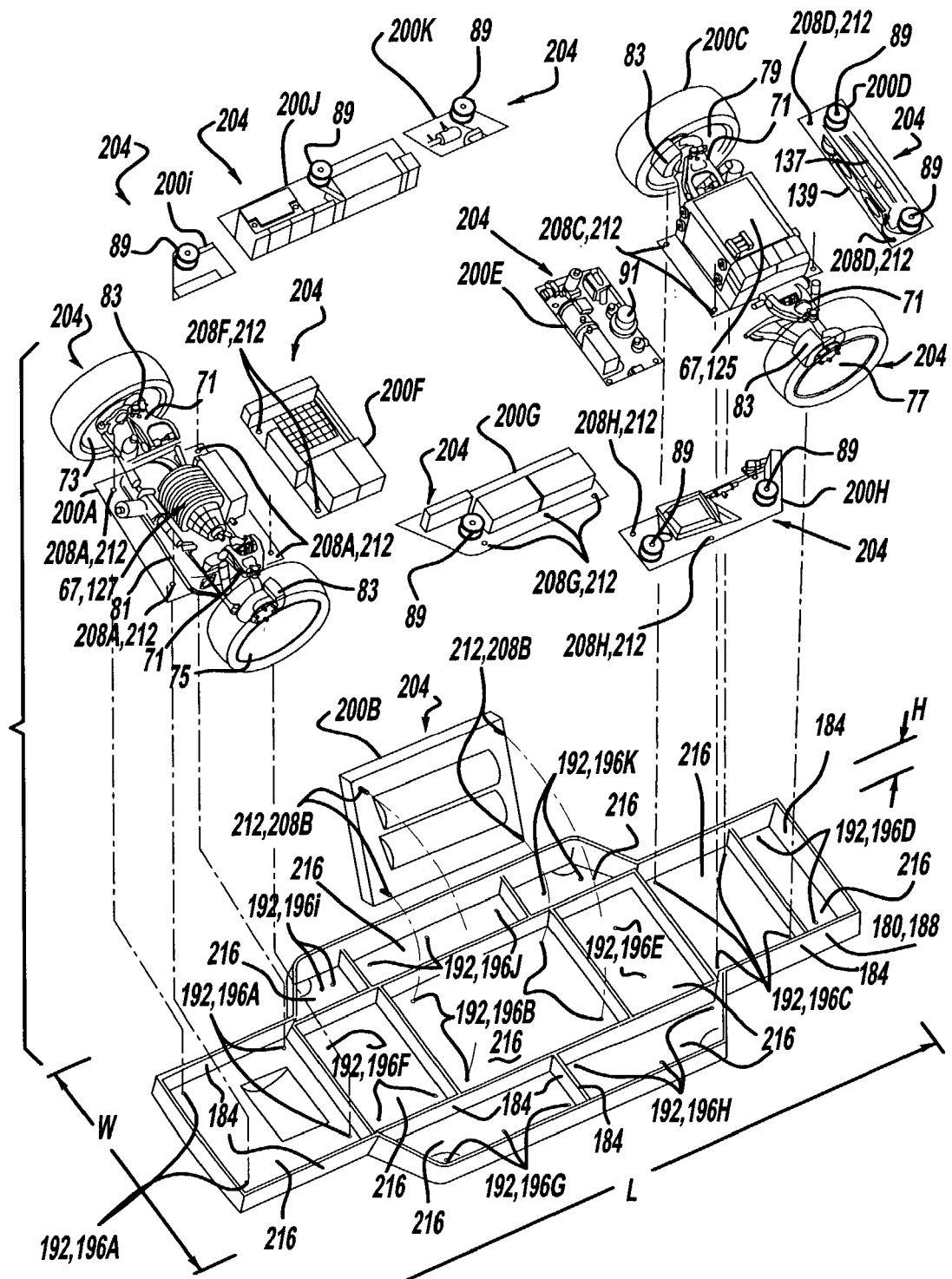
FIG. 23 is yet another schematic perspective illustration of the alternative structural frame and preassembled modules of FIG. 22.

Referring to FIG. 23, wherein like reference numbers refer to like components from FIG. 22, the preassembled modules of FIG. 22 each include a module interface 208A, 208B, 208C, 208D, 208F, 208G, 208H for mounting the module with respect to the structural frame 188. The module interfaces 208A, 208B, 208C, 208D, 208F, 208G, 208H have at least one locking or fastening element 212 engageable with one of the locking or fastening elements 192 in one of the frame interfaces 196A-196K, such that the module interface 208A, 208B, 208C, 208D, 208F, 208G, 208H is engageable with, or complementary to, one of the frame interfaces 196A-196K. The locking or fastening elements 212 in the embodiment depicted are threaded studs which engage the locking or fastening elements 192 on the structural frame 188 with a nut (not shown).

The surface of preassembled module 200B that faces the structural frame 188 when the preassembled module is mounted with respect thereto is depicted in FIG. 23 to provide an unobstructed exemplary illustration of a module interface 208B. Preferably, each module interface 208A, 208B, 208C, 208D, 208F, 208G, 208H includes at least two locking or fastening elements 212 in a predetermined spatial relationship with one another (hereinafter referred to as a "module interface configuration") substantially identical to the spatial relationship of the locking or fastening elements 192 in one of the frame interfaces 196A-196K.

The frame interfaces 196A-196K have frame interface configurations sufficiently different from one another such that a module interface configured for engagement with one of the frame interfaces 196A-196K is not engageable with the other frame interfaces 196A-196K. In other words, each frame interface 196A-196K is not engageable with a module 200A-200K having a module interface configuration substantially identical to the configuration of another frame interface 196A-196K. Each module 200A-200K used in the assembly of a chassis has a module interface configuration different from the module interface configurations of the other modules 200A-200K and thus only one corresponding frame attachment interface 196A-196K with which it can engage, enabling a chassis manufacturer to reduce the possibility of error in chassis assembly.

Frame interface 196A is engageable with, or complementary to, the module interface 208A of preassembled module 200A; frame interface 196B is engageable with the module interface 208B of preassembled module 200B; frame interface 196C is engageable with the module interface 208C of preassembled module 200C; frame interface 196D is engageable with the module interface 208D of preassembled module 200D; frame interface 196E is engageable with the module interface of preassembled module 200E; frame interface 196F is engageable with the module interface 208F of preassembled module 200F; frame interface 196G is engageable with the module interface 208G of preassembled module 200G; frame interface 196H is engageable with the module interface 208H of preassembled module 200H; frame interface 196i is engageable with the module interface of preassembled module 200i; frame interface 196J is engageable with the module interface of preassembled module 200J; and frame interface 196K is engageable with the module interface of preassembled module 200K.

The formations 184 on the rigid sheet 180 form a plurality of cavities 216. Each of the cavities 216 has a size and shape that is sufficient to locate with respect to the structural frame 188, and at least partially contain, one of the preassembled modules 200A-200K. The formations 184 thus serve as locating members, facilitating chassis assembly by providing guides for the placement of the various preassembled modules 200A-200K. The size and shape of each cavity 216 is preferably large enough to at least partially contain one of the preassembled modules 200A-200K, but small enough so that placement of the module 200A-200K within the cavity 216 will substantially locate the module 200A-200K with respect to the structural frame 188. Preferably, each preassembled module 200A-200K has a size and shape different from the other preassembled modules to further clarify the placement of the modules 200A-200K with respect to the structural frame 188.

Figure 24:
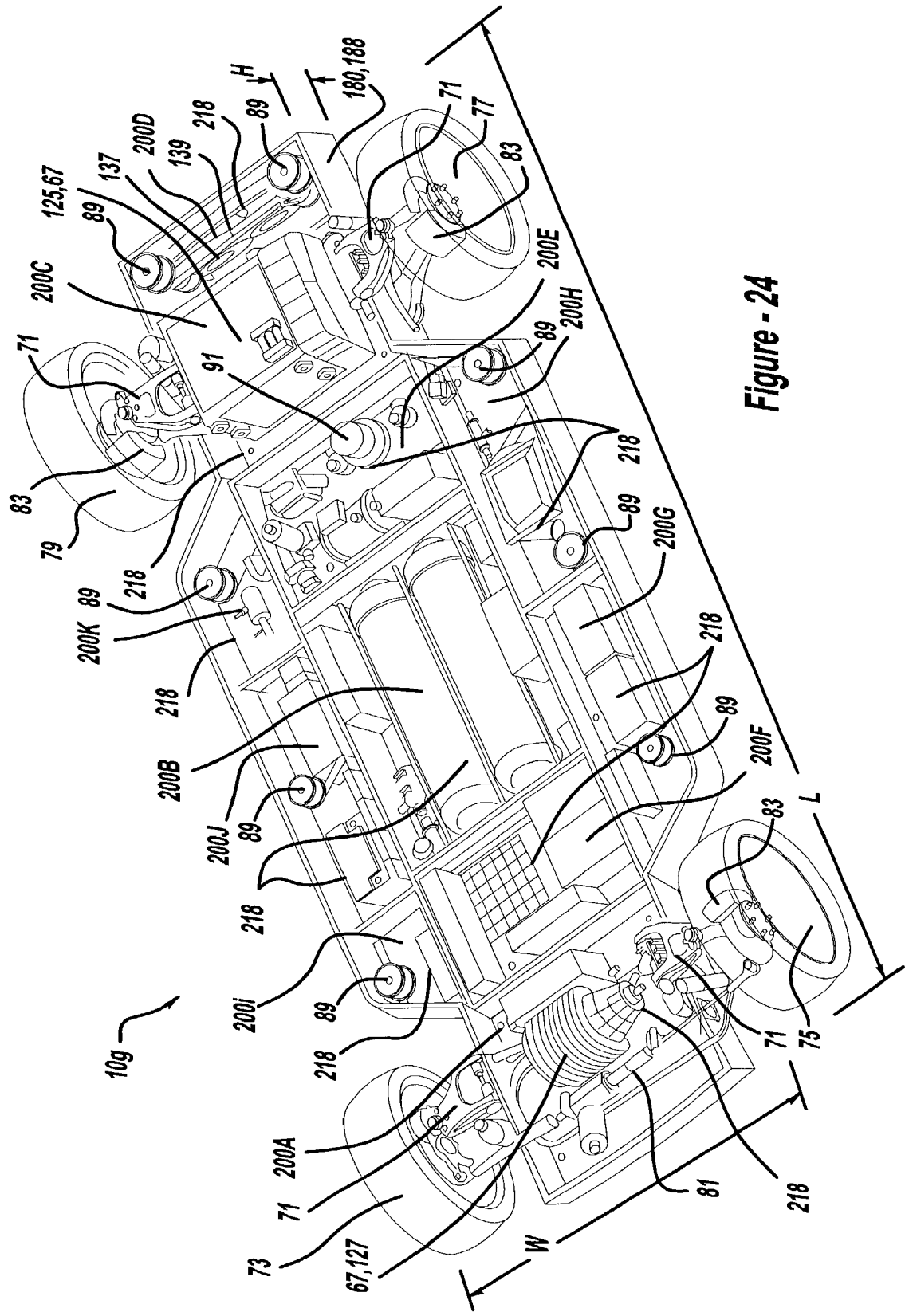
FIG. 24 is a schematic perspective illustration of a rolling platform according to yet another aspect of the invention and assembled with the alternative structural frame and preassembled modules of FIGS. 22 and 23.

In FIG. 24, wherein like reference numbers refer to like components from FIGS. 22 and 23, a fully-assembled chassis 10g employing a structural frame 188 and a set 218 of preassembled chassis modules 200A-200K substantially as shown in FIGS. 22 and 23 is schematically depicted. The module interface of each of the preassembled modules 200A-200K is operatively engaged with one of the frame interfaces such that each of the preassembled modules 200A-200K is mounted with respect to the structural frame 188. The chassis has a length L.

Figure 25:
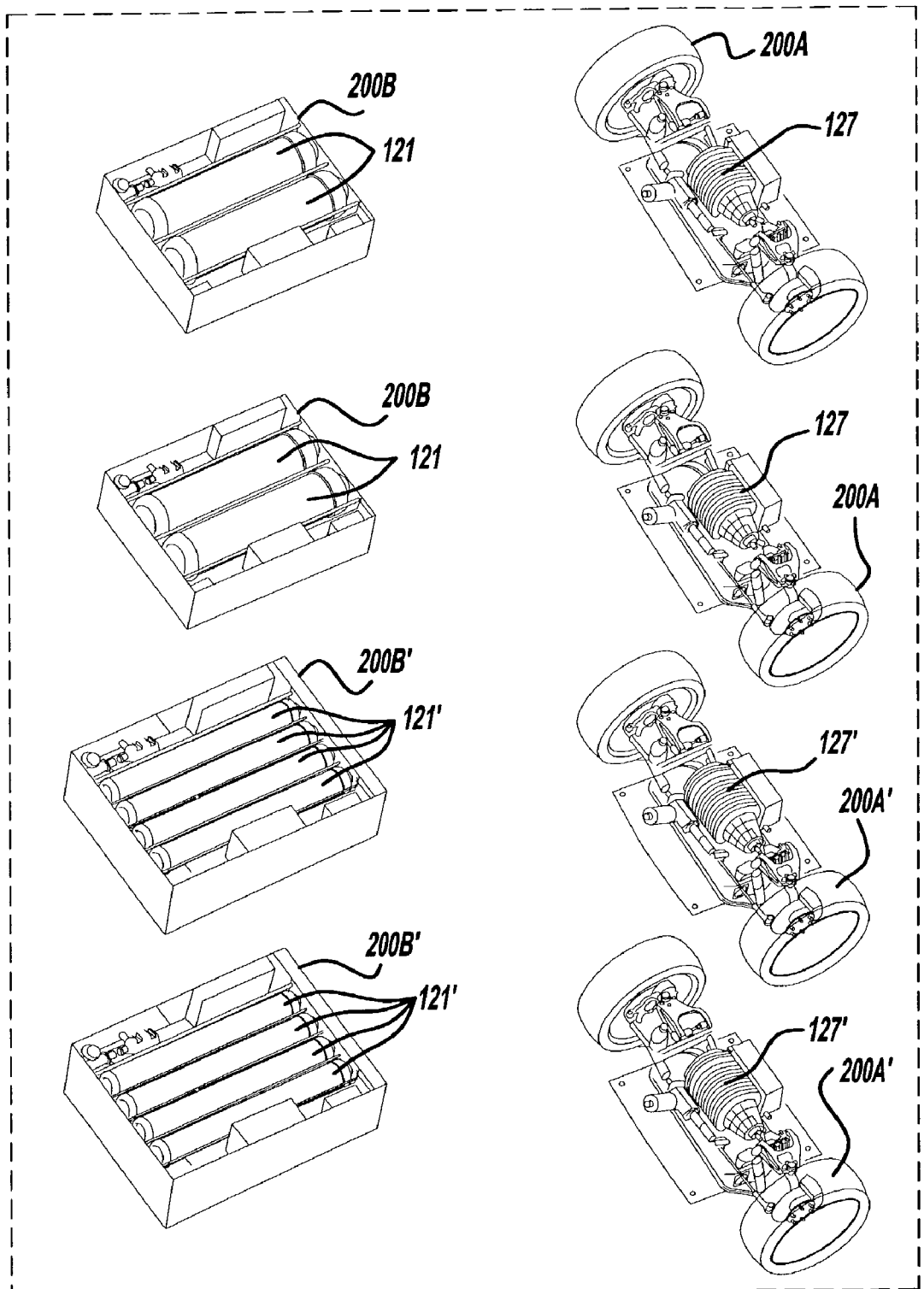
FIG. 25 is a schematic illustration of an inventory of preassembled modules.

Referring to FIG. 25, wherein like reference numbers refer to like components from FIGS. 22-24, an inventory 220 of preassembled chassis modules is schematically depicted. The inventory 220 includes hydrogen storage modules 200B, 200B'. The hydrogen storage modules 200B, 200B' represent a first version and a second version, respectively, of the hydrogen storage module. Hydrogen storage module 200B has two hydrogen storage tanks 121, whereas hydrogen storage module 200B' has four hydrogen storage tanks 121'. The vehicular components 121, 121' of the first version and the second version perform the same function, i.e., the storage of hydrogen gas. However, the components 121 of the first version 200B are differently-configured from the components 121' of the second version 200B'. Both versions 200B, 200B' have a common module interface configuration.

The common module interface configuration enables interchangeability between the two versions 200B, 200B' in a chassis assembly. This interchangeability enables an assembler of vehicle chassis to assemble chassis of different characteristics by selecting subassembly modules having different vehicular componentry configurations, such as dimensions, materials, capacities, etc.

The inventory 220 similarly includes two versions of preassembled module 200A, 200A'. Preassembled modules 200A, 200A' both include an electric traction motor 127, 127' to drive wheels. However, the electric traction motor 127' of preassembled module 200A' is larger and has greater output capacity than the electric traction motor 127 of preassembled module 200A. Both versions 200A, 200A' have common module interface configurations that are different from the module interface configuration of the hydrogen storage modules 200, 200B'.

Figure 26:
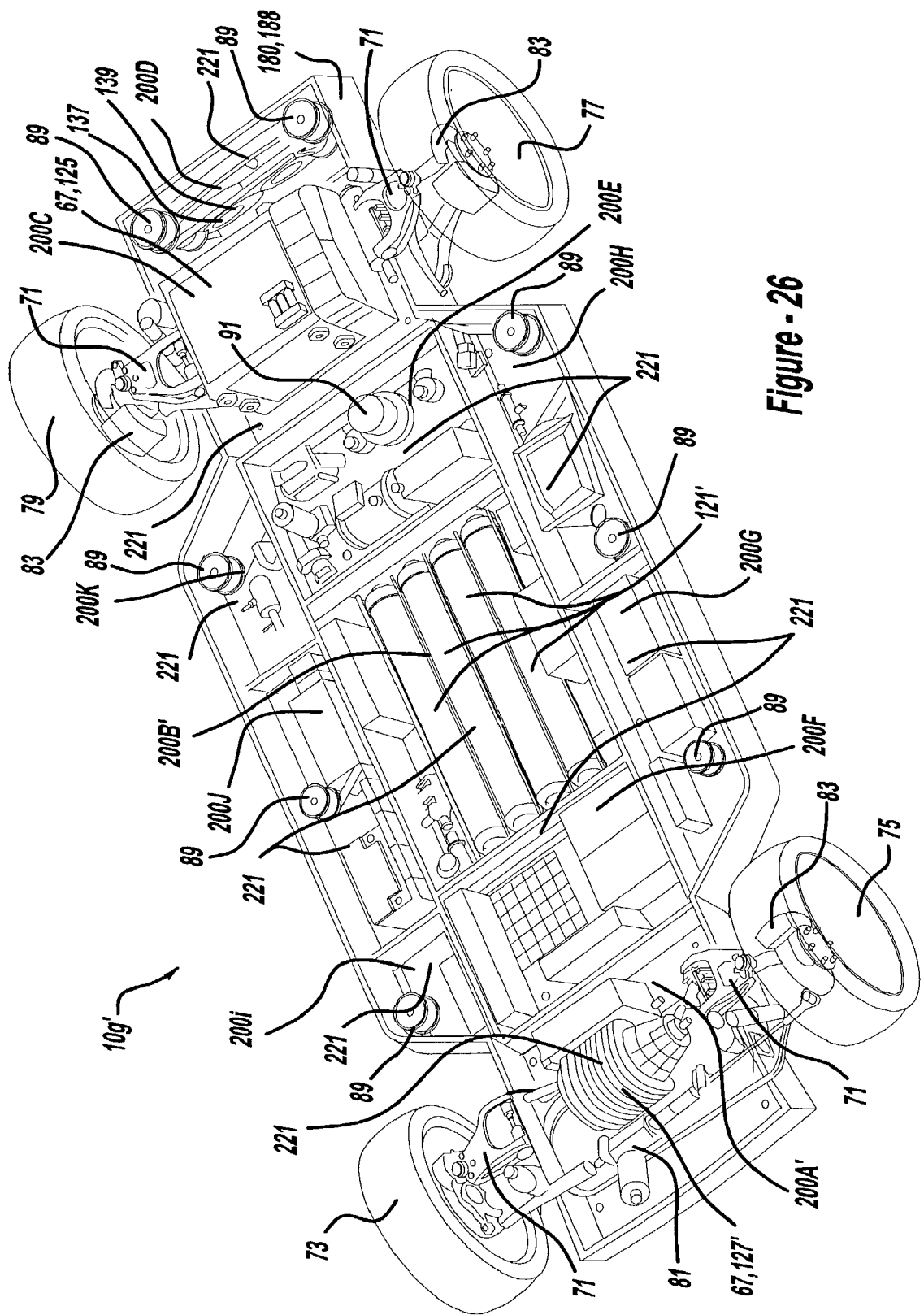
FIG. 26 is a perspective schematic illustration of a rolling platform assembled with preassembled modules from the inventory depicted in FIG. 25.

Referring to FIG. 26, wherein like reference numbers refer to like components from FIGS. 22-25, a chassis 10g' employing a set 221 of preassembled modules is schematically depicted. The set 221 of preassembled modules includes the second version 200B' of the hydrogen storage module selected from the inventory of FIG. 25, and the second version of preassembled module 200A' selected from the inventory of FIG. 25. The chassis 10g' includes a structural frame 188 having frame interfaces substantially identical to the frame interfaces 196A-196K of FIGS. 22-24.

Figure 27:
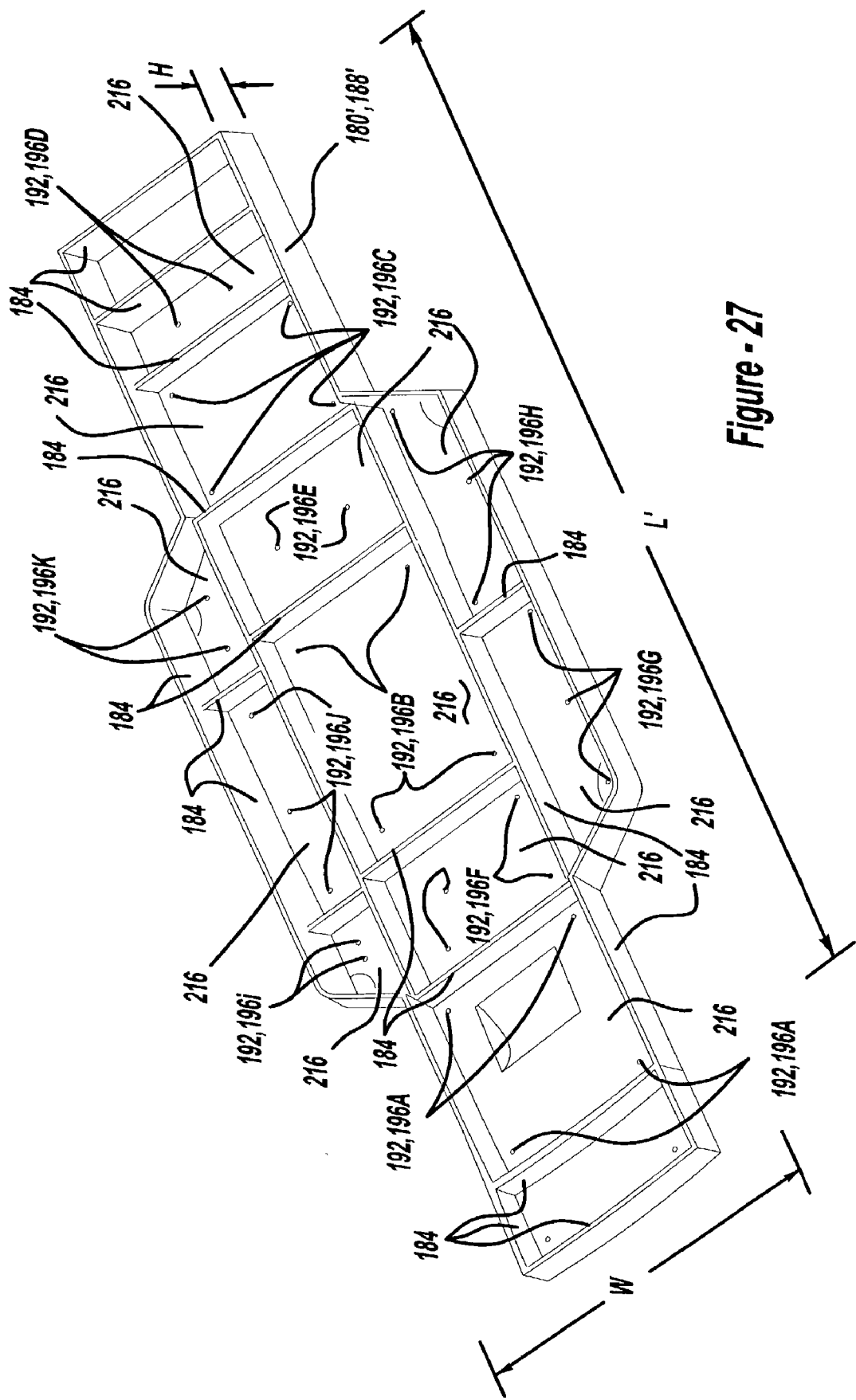
FIG. 27 is a schematic illustration of a structural frame having identical frame interfaces as, and being differently dimensioned from, the structural frame of FIGS. 22-24.
Figure 28:
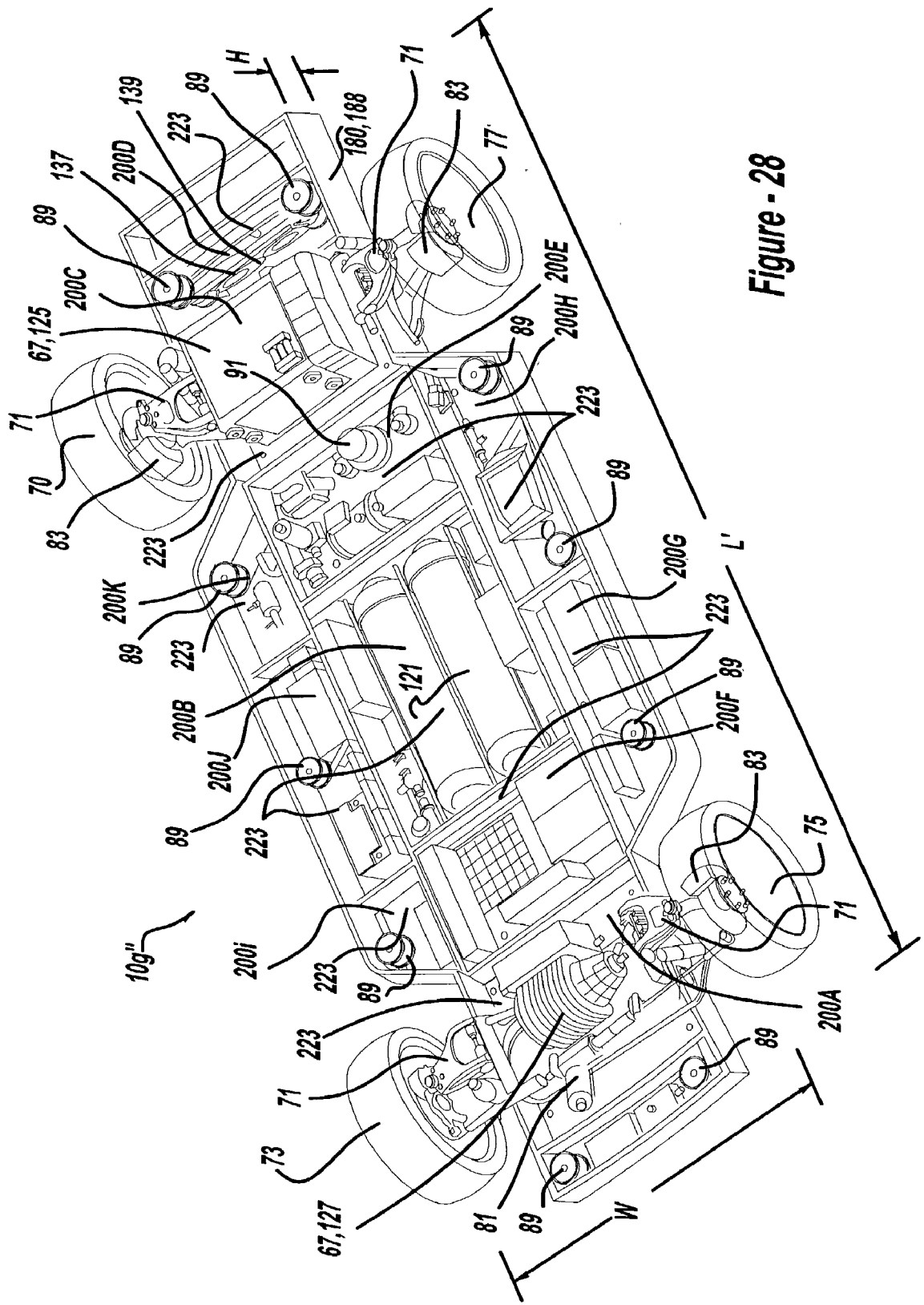
FIG. 28 is a schematic perspective illustration of a rolling platform assembled with the structural frame of FIG. 27 and preassembled modules.

Chassis having varying dimensions may be assembled, with each chassis having frame interfaces in substantially similar spatial relationships with one another. Referring to FIG. 27, wherein like reference numbers refer to like components from FIGS. 22-26, a structural frame 188' having length L☐, which is longer than length L, has a second set of frame interfaces 196A-196K that are substantially identical to, and in substantially the same spatial relationship as, the frame interfaces 196A-196K of the structural frame 188 depicted in FIGS. 22-24. FIG. 28, wherein like reference numbers refer to like components from FIGS. 22-27, is a schematic depiction of a fully-functional chassis 10g" having length L☐. The chassis 10g" includes a set 223 of preassembled modules 200A-200K mounted with respect to structural frame 188' at their respective module interfaces.

Referring to FIG. 29, a method for advantageously employing preassembled modules to assemble chassis is schematically depicted. The method comprises maintaining an inventory of preassembled modules having vehicular componentry and module interfaces engageable with a complementary interface 224. The module interface of each of the preassembled modules has a common module interface configuration. The method also includes assembling a first vehicle chassis having a first length, width, and height 228. The first vehicle chassis has a first structural frame; a first steering system; a first braking system; a first energy conversion system; a first energy storage system operatively connected to the first energy conversion system; a first suspension system mounted with respect to the first structural frame; and a first set of at least three wheels mounted with respect to the first suspension system. The first steering system, first braking system, and first energy conversion system are mounted with respect to the first structural frame, responsive to nonmechanical control signals, and operatively connected to at least one wheel.

A first structural frame interface is mounted with respect to the structural frame and is complementary to, or engageable with, the module interfaces of the preassembled modules in the inventory. A first module selected from the inventory has componentry that at least partially forms at least one of the first steering system, first braking system, first suspension system, first energy conversion system, and first energy storage system. The module interface of the first module is engaged with the first structural frame interface such that the first module is mounted with respect to the first structural frame.

The use of preassembled modules with common module interfaces may provide increased flexibility to chassis assemblers by facilitating the use of differently-configured components in different chassis. The inventory may contain a first version and a second version of preassembled modules. The vehicular componentry of the first version and the vehicular componentry of the second version are configured to perform a common vehicular function. However, the vehicular componentry of the first version has a different configuration from the vehicular componentry of the second version. The preassembled modules of the first version and the preassembled modules of the second version have substantially identical module interfaces to facilitate interchangeability between the first version and the second version.

Correspondingly, the method may further comprise assembling a second vehicle chassis having a second structural frame; a second steering system; a second braking system; a second energy conversion system; a second energy storage system operatively connected to the second energy conversion system; a second suspension system mounted with respect to the second structural frame; and a second set of at least three wheels mounted with respect to the second suspension system 232. The second steering system, second braking system, and second energy conversion system are mounted with respect to the second structural frame, responsive to nonmechanical control signals, and operatively connected to at least one wheel.

A second structural frame interface is mounted with respect to the second structural frame, and is complementary to, or engageable with, the module interfaces of the preassembled modules in the inventory. A second module selected from the inventory has componentry that at least partially forms at least one of the second steering system, second braking system, second suspension system, second energy conversion system, and second energy storage system. The module interface of the second module is engaged with the second structural frame interface such that the second module is mounted with respect to the second structural frame. The second module is a different version than the first module.

The use of common frame interfaces in chassis of different sizes provides chassis assemblers with efficiencies of scale: preassembled modules having common module interfaces may be employed across a range of chassis sizes and variations. Accordingly, the method may further include assembling a third chassis having a second length, second width, and second height 236. The third chassis is differently dimensioned from the first chassis such that the second length is different from the first length, the second width is different from the first width, or the second height is different from the first height.

The third chassis includes a third structural frame; a third steering system; a third braking system; a third energy conversion system; a third energy storage system operatively connected to the third energy conversion system; a third suspension system mounted with respect to the third structural frame; and a third set of at least three wheels mounted with respect to the third suspension system. The third steering system, third braking system, and third energy conversion system are mounted with respect to the third structural frame, responsive to nonmechanical control signals, and operatively connected to at least one wheel.

A third structural frame interface is mounted with respect to the third structural frame and is complementary to, or engageable with, the module interfaces of the preassembled modules in the inventory. A third module selected from the inventory has componentry that at least partially forms at least one of the third steering system, third braking system, third suspension system, third energy conversion system, and third energy storage system. The module interface of the third module is engaged with the third structural frame interface such that the third module is mounted with respect to the third structural frame.

FIG. 30 depicts another method for advantageously employing preassembled modules in the assembly of chassis. The use of preassembled modules having different module interface configurations may be used to minimize the possibility of error in chassis assembly. The method comprises maintaining an inventory of preassembled modules each having vehicular components and a module interface with a plurality of locking or fastening elements 240. The inventory includes a plurality of preassembled modules having module interface configurations different from one another. The method also includes assembling a first chassis having a first length, a first width, and a first height 244.

The first chassis includes a first structural frame with a plurality of fastening or locking elements mounted with respect to the first structural frame. The plurality of fastening or locking elements defines a first set of frame interfaces having a predetermined spatial relationship with one another. Each of the frame interfaces is configured to engage only one of the module interface configurations in the inventory. The first set of frame interfaces preferably includes at least two frame interfaces having frame interface configurations sufficiently different from one another such that a module interface configured for engagement with one of the at least two frame interfaces is not engageable with the any of the other at least two frame interfaces.

A first by-wire steering system, a first by-wire braking system, a first by-wire energy conversion system, and a first suspension system are mounted with respect to the first structural frame. A first energy storage system is operatively connected to the first energy conversion system, and a first set of at least three wheels is mounted with respect to the first suspension system.

A first set of preassembled modules selected from the inventory at least partially forms at least one of the first steering system, first braking system, first energy conversion system, first energy storage system, and first suspension system. The module interface of each of the first set of preassembled modules is engaged with one of the first set of frame interfaces such that the first set of preassembled modules is mounted with respect to the first structural frame.

The method may further include assembling a second chassis having a second length, a second width, and a second height. The second chassis is differently dimensioned from the first chassis such that the second length is different from the first length, the second width is different from the first width, or the second height is different from the first height. The second chassis includes a second structural frame with a plurality of fastening or locking elements mounted with respect to the second structural frame. The plurality of fastening or locking elements defines a second set of frame interfaces substantially identical to the first set of frame interfaces. The second set of frame interfaces has a predetermined spatial relationship relative to one another that is substantially identical to the predetermined spatial relationship of the first set of frame interfaces.

A second by-wire steering system, a second by-wire braking system, a second by-wire energy conversion system, and a second suspension system are mounted with respect to the second structural frame. A second energy storage system is operatively connected to the second energy conversion system, and a second set of at least three wheels is mounted with respect to the second suspension system.

A second set of preassembled modules selected from the inventory at least partially forms at least one of the second steering system, second braking system, second energy conversion system, second energy storage system, and second suspension system. The module interface of each of the second set of preassembled modules is engaged with one of the second set of frame interfaces such that the second set of preassembled modules is mounted with respect to the second structural frame.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

The invention claimed is:

1. A vehicle chassis comprising:

a structural frame;

vehicular systems mounted with respect to the structural frame, the vehicular systems including a suspension system, a steering system, a braking system, an energy conversion system, and an energy storage system operatively connected to the energy conversion system;

at least three wheels rotatably mounted with respect to the suspension system; and a plurality of preassembled modules having vehicular components at least partially forming at least one of the suspension system, the steering system, the braking system, the energy conversion system, and the energy storage system;

wherein the steering system, braking system, and energy conversion system are responsive to nonmechanical control signals and operatively connected to at least one of the wheels;

wherein each of the plurality of preassembled modules is characterized by a module interface having at least one locking or fastening element, wherein said vehicle chassis further comprises a plurality of frame interfaces mounted with respect to the structural frame, each of the plurality of frame interfaces having at least one complementary locking or fastening element engageable with the at least one locking or fastening element in the module interface of one of the plurality of preassembled modules;

wherein the module interface of each of the plurality of preassembled modules is operatively engaged with one of the plurality of frame interfaces such that each of the plurality of preassembled modules is mounted with respect to the structural frame; and wherein the preassembled modules have module interfaces different from one another; and wherein each of the plurality of frame interfaces is engageable with the module interface of only one of the plurality of preassembled modules to prevent errors in assembly.

2. A vehicle chassis comprising:

a structural frame;

vehicular systems mounted with respect to the structural frame, the vehicular systems including a suspension system, a steering system, a braking system, an energy conversion system, and an energy storage system operatively connected to the energy conversion system;

at least three wheels rotatably mounted with respect to the suspension system;

a plurality of preassembled modules having vehicular components at least partially forming at least one of the suspension system, the steering system, the braking system, the energy conversion system, and the energy storage system;

wherein the steering system, braking system, and energy conversion system are responsive to nonmechanical control signals and operatively connected to at least one of the wheels;

wherein each of the plurality of preassembled modules is characterized by a module interface having at least one locking or fastening element, and said vehicle chassis further comprising a plurality of frame interfaces mounted with respect to the structural frame, each of the plurality of frame interfaces having at least one complementary locking or fastening element engageable with the at least one locking or fastening element in the module interface of one of the plurality of preassembled modules;

wherein the module interface of each of the plurality of preassembled modules is operatively engaged with one of the plurality of frame interfaces such that each of the plurality of preassembled modules is mounted with respect to the structural frame;

wherein the preassembled modules have module interfaces different from one another; and wherein each of the plurality of frame interfaces is engageable with the module interface of only one of the plurality of preassembled modules to prevent errors in assembly; and wherein the module interface of each of the plurality of preassembled modules includes at least two locking or fastening elements; wherein the at least two locking or fastening elements are in a predetermined spatial relationship with one another; wherein the predetermined spatial relationship of the at least two locking or fastening elements is different for each of the plurality of preassembled modules; and wherein each of the plurality of frame interfaces has at least two complementary locking or fastening elements in the same predetermined spatial relationship as the locking or fastening elements of one of the plurality of preassembled modules.

* * * * *